(12) United States Patent
Yamazaki et al.

(10) Patent No.: US 10,865,870 B2
(45) Date of Patent: Dec. 15, 2020

(54) BICYCLE SPROCKET

(71) Applicant: SHIMANO INC., Sakai (JP)

(72) Inventors: Azusa Yamazaki, Sakai (JP); Kenji Kamada, Sakai (JP)

(73) Assignee: SHIMANO INC., Sakai (JP)

( * ) Notice: Subject to any disclaimer, the term of this patent is extended or adjusted under 35 U.S.C. 154(b) by 265 days.

(21) Appl. No.: 16/028,425

(22) Filed: Jul. 6, 2018

(65) Prior Publication Data
US 2020/0011408 A1 Jan. 9, 2020

(51) Int. Cl.
F16H 55/30 (2006.01)
B62M 9/12 (2006.01)

(52) U.S. Cl.
CPC ............... F16H 55/30 (2013.01); B62M 9/12 (2013.01)

(58) Field of Classification Search
CPC .......... B62M 9/10; B62M 9/105; B62M 9/12; F16H 55/08; F16H 55/30
USPC ........................................ 474/160, 152, 156
See application file for complete search history.

(56) References Cited

U.S. PATENT DOCUMENTS

| 4,608,878 | A | * | 9/1986 | Shimano | ................ | B62K 19/34 |
| | | | | | | 474/152 |
| 4,889,521 | A | * | 12/1989 | Nagano | ................... | B62M 9/10 |
| | | | | | | 474/164 |
| 6,340,338 | B1 | * | 1/2002 | Kamada | ................... | B62M 9/10 |
| | | | | | | 474/152 |
| 6,475,110 | B1 | * | 11/2002 | Yamanaka | ............... | B62J 13/00 |
| | | | | | | 474/144 |
| 7,686,721 | B2 | * | 3/2010 | Tabe | ....................... | B62M 9/105 |
| | | | | | | 474/116 |
| 7,824,287 | B2 | * | 11/2010 | Nonoshita | .............. | B62M 9/105 |
| | | | | | | 474/152 |
| 8,092,329 | B2 | * | 1/2012 | Wickliffe | ............... | B62M 9/105 |
| | | | | | | 474/160 |
| 8,235,850 | B2 | * | 8/2012 | Lin | ........................ | B62M 9/105 |
| | | | | | | 474/160 |
| 8,517,874 | B2 | * | 8/2013 | Reiter | ...................... | B62M 9/10 |
| | | | | | | 474/160 |
| 8,550,944 | B2 | * | 10/2013 | Esquibel | ................... | B62M 9/10 |
| | | | | | | 474/160 |
| 9,334,014 | B2 | * | 5/2016 | Fukunaga | ................ | B62M 9/10 |
| 9,403,578 | B1 | * | 8/2016 | Yoshida | ................... | B62M 9/12 |
| 9,463,844 | B2 | * | 10/2016 | Fukunaga | ............... | B62M 9/10 |
| 9,926,038 | B2 | * | 3/2018 | Fukunaga | ............... | B62M 9/10 |

(Continued)

Primary Examiner — Henry Y Liu
(74) Attorney, Agent, or Firm — Mori & Ward, LLP

(57) ABSTRACT

A bicycle sprocket comprises a sprocket body and a plurality of sprocket teeth. The plurality of sprocket teeth includes at least one first axially recessed upshifting-facilitation tooth with respect to a rotational center axis. The plurality of sprocket teeth includes at least one first axially recessed downshifting-facilitation tooth with respect to the rotational center axis. The at least one first axially recessed downshifting-facilitation tooth is adjacent to the at least one first axially recessed upshifting-facilitation tooth without another tooth therebetween in a circumferential direction with respect to the rotational center axis. The at least one first axially recessed upshifting-facilitation tooth and the at least one first axially recessed downshifting-facilitation tooth provide a first continuous recess extending in the circumferential direction.

20 Claims, 18 Drawing Sheets

(56) References Cited

U.S. PATENT DOCUMENTS

| | | | |
|---|---|---|---|
| 2007/0049437 A1* | 3/2007 | Wickliffe | F16H 55/30 |
| | | | 474/152 |
| 2009/0111631 A1* | 4/2009 | Wickliffe | F16H 55/303 |
| | | | 474/152 |
| 2010/0137086 A1* | 6/2010 | Lin | B62M 9/105 |
| | | | 474/160 |
| 2011/0092327 A1* | 4/2011 | Oishi | B62M 9/10 |
| | | | 474/160 |
| 2016/0207590 A1* | 7/2016 | Fukumori | F16H 55/30 |
| 2017/0029066 A1* | 2/2017 | Fukunaga | F16H 55/303 |

* cited by examiner

BICYCLE SPROCKET

BACKGROUND OF THE INVENTION

Field of the Invention

The present invention relates to a bicycle sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle sprocket.

SUMMARY OF THE INVENTION

In accordance with a first aspect of the present invention, a bicycle sprocket comprises a sprocket body and a plurality of sprocket teeth. The sprocket body has a first axially-facing surface and a second axially-facing surface with respect to a rotational center axis of the bicycle sprocket. The second axially-facing surface is opposite to the first axially-facing surface in an axial direction with respect to the rotational center axis. The first axially-facing surface is configured to face a center plane of a bicycle in an assembled state where the bicycle sprocket is mounted to the bicycle. The plurality of sprocket teeth extends radially outwardly from the sprocket body with respect to the rotational center axis. The plurality of sprocket teeth includes at least one first axially recessed upshifting-facilitation tooth with respect to the rotational center axis. The at least one first axially recessed upshifting-facilitation tooth is recessed from the second axially-facing surface toward the first axially-facing surface. The plurality of sprocket teeth includes at least one first axially recessed downshifting-facilitation tooth with respect to the rotational center axis. The at least one first axially recessed downshifting-facilitation tooth is recessed from the second axially-facing surface toward the first axially-facing surface. The at least one first axially recessed downshifting-facilitation tooth is adjacent to the at least one first axially recessed upshifting-facilitation tooth without another tooth therebetween in a circumferential direction with respect to the rotational center axis. The at least one first axially recessed upshifting-facilitation tooth and the at least one first axially recessed downshifting-facilitation tooth provide a first continuous recess extending in the circumferential direction.

With the bicycle sprocket according to the first aspect, the first continuous recess can reduce a circumferential range of a shifting facilitation area configured to facilitate a shifting operation in which a bicycle chain is shifted between the bicycle sprocket and another sprocket. This can increase a total number of shifting facilitation areas in the bicycle sprocket. Thus, it is possible to certainly and quickly perform the shifting operation in the shifting facilitation area.

In accordance with a second aspect of the present invention, the bicycle sprocket according to the first aspect is configured so that the at least one first axially recessed downshifting-facilitation tooth is provided on an upstream side of the at least one first axially recessed upshifting-facilitation tooth in a rotational driving direction of the bicycle sprocket.

With the bicycle sprocket according to the second aspect, it is possible to more certainly perform the shifting operation in the shifting facilitation area.

In accordance with a third aspect of the present invention, the bicycle sprocket according to the first or second aspect is configured so that the at least one first axially recessed upshifting-facilitation tooth includes a first upshifting-facilitation tooth and a first additional upshifting-facilitation tooth. The first upshifting-facilitation tooth is recessed in the axial direction. The first additional upshifting-facilitation tooth is recessed in the axial direction and is adjacent to the first upshifting-facilitation tooth without another tooth therebetween in the circumferential direction.

With the bicycle sprocket according to the third aspect, the first upshifting-facilitation tooth and the first additional upshifting-facilitation tooth smoothly perform an upshifting operation in which the bicycle chain is shifted from the bicycle sprocket to a smaller sprocket.

In accordance with a fourth aspect of the present invention, the bicycle sprocket according to any one of the first to third aspects is configured so that the plurality of sprocket teeth includes a lastly chain-engaging upshifting-facilitation tooth adjacent to the at least one first axially recessed upshifting-facilitation tooth without another tooth therebetween in the circumferential direction. The lastly chain-engaging upshifting-facilitation tooth is provided on a downstream side of the at least one first axially recessed upshifting-facilitation tooth in the rotational driving direction.

With the bicycle sprocket according to the fourth aspect, the lastly chain-engaging upshifting-facilitation tooth smoothly performs the upshifting operation.

In accordance with a fifth aspect of the present invention, the bicycle sprocket according to any one of the first to fourth aspects is configured so that the at least one first axially recessed downshifting-facilitation tooth includes a first downshifting-facilitation tooth and a first additional downshifting-facilitation tooth. The first downshifting-facilitation tooth is recessed in the axial direction. The first additional downshifting-facilitation tooth is recessed in the axial direction and is adjacent to the first downshifting-facilitation tooth without another tooth therebetween in the circumferential direction.

With the bicycle sprocket according to the fifth aspect, the first downshifting-facilitation tooth and the first additional downshifting-facilitation tooth smoothly perform a downshifting operation in which the bicycle chain is shifted from a smaller sprocket to the bicycle sprocket.

In accordance with a sixth aspect of the present invention, the bicycle sprocket according to any one of the first to fifth aspects is configured so that the plurality of sprocket teeth includes an initially chain-engaging downshifting-facilitation tooth adjacent to the at least one first axially recessed downshifting-facilitation tooth without another tooth therebetween in the circumferential direction. The initially chain-engaging downshifting-facilitation tooth is provided on an upstream side of the at least one first axially recessed downshifting-facilitation tooth in the rotational driving direction.

With the bicycle sprocket according to the sixth aspect, the initially chain-engaging downshifting-facilitation tooth smoothly performs the downshifting operation.

In accordance with a seventh aspect of the present invention, the bicycle sprocket according to the first or second aspect is configured so that the at least one first axially recessed upshifting-facilitation tooth includes a first upshifting-facilitation tooth and a first additional upshifting-facilitation tooth. The first upshifting-facilitation tooth is recessed in the axial direction. The first additional upshifting-facilitation tooth is recessed in the axial direction and is adjacent to the first upshifting-facilitation tooth without another tooth therebetween in the circumferential direction. The at least one first axially recessed downshifting-facilitation tooth includes a first downshifting-facilitation tooth and a first additional downshifting-facilitation tooth. The first downshifting-facilitation tooth is recessed in the axial direction. The first additional downshifting-facilitation tooth is recessed in the axial direction and is adjacent to the first downshifting-facilitation tooth without another tooth therebetween in the circumferential direction. The first upshifting-facilitation tooth, the first additional upshifting-facilitation tooth, the first downshifting-facilitation tooth, and the first additional downshifting-facilitation tooth provide the first continuous recess.

With the bicycle sprocket according to the seventh aspect, it is possible to more certainly perform the shifting operation in the shifting facilitation area.

In accordance with an eighth aspect of the present invention, the bicycle sprocket according to the seventh aspect is configured so that the first additional upshifting-facilitation tooth is adjacent to the first additional downshifting-facilitation tooth without another tooth therebetween in the circumferential direction.

With the bicycle sprocket according to the eighth aspect, it is possible to increase the total number of the shifting facilitation areas in the bicycle sprocket.

In accordance with a ninth aspect of the present invention, the bicycle sprocket according to the eighth aspect is configured so that the first additional upshifting-facilitation tooth is provided on a downstream side of the first additional downshifting-facilitation tooth in the rotational driving direction.

With the bicycle sprocket according to the ninth aspect, it is possible to increase the total number of the shifting facilitation areas in the bicycle sprocket.

In accordance with a tenth aspect of the present invention, the bicycle sprocket according to any one of the first to ninth aspects is configured so that the plurality of sprocket teeth includes at least one second axially recessed upshifting-facilitation tooth with respect to the rotational center axis. The plurality of sprocket teeth includes at least one second axially recessed downshifting-facilitation tooth with respect to the rotational center axis. The at least one second axially recessed downshifting-facilitation tooth is adjacent to the at least one second axially recessed upshifting-facilitation tooth without another tooth therebetween in the circumferential direction. The at least one second axially recessed downshifting-facilitation tooth is provided on an upstream side of the at least one second axially recessed upshifting-facilitation tooth in the rotational driving direction of the bicycle sprocket. The at least one second axially recessed upshifting-facilitation tooth and the at least one second axially recessed downshifting-facilitation tooth provide a second continuous recess extending in the circumferential direction with respect to the rotational center axis.

With the bicycle sprocket according to the tenth aspect, the at least one second axially recessed upshifting-facilitation tooth and the at least one second axially recessed downshifting-facilitation tooth can make the shifting operation quicker.

In accordance with an eleventh aspect of the present invention, the bicycle sprocket according to any one of the first to tenth aspects is configured so that the first continuous recess has a plurality of recess depths defined from the second axially-facing surface of the sprocket body in the axial direction.

With the bicycle sprocket according to the eleventh aspect, it is possible to maintain strength of the bicycle sprocket in the shifting facilitation area with certainly performing the shifting operation in the shifting facilitation area.

In accordance with a twelfth aspect of the present invention, the bicycle sprocket according to the eleventh aspect is configured so that the at least one first axially recessed upshifting-facilitation tooth includes a first upshifting-facilitation tooth and a first additional upshifting-facilitation tooth. The first upshifting-facilitation tooth is recessed in the axial direction. The first additional upshifting-facilitation tooth is recessed in the axial direction and is adjacent to the first axially recessed upshifting-facilitation tooth without another tooth therebetween in the circumferential direction. The first additional upshifting-facilitation tooth is provided on an upstream side of the first upshifting-facilitation tooth in the rotational driving direction. The plurality of recess depths includes a first upshifting recess depth and a second upshifting recess depth. The first upshifting recess depth is defined from the second axially-facing surface of the sprocket body in the axial direction. The second upshifting recess depth is defined from the second axially-facing surface of the sprocket body in the axial direction. The second upshifting recess depth is different from the first upshifting recess depth. The first upshifting-facilitation tooth at least partly has the first upshifting recess depth. The first additional upshifting-facilitation tooth at least partly has the second upshifting recess depth.

With the bicycle sprocket according to the twelfth aspect, it is possible to maintain strength of the bicycle sprocket in the shifting facilitation area with certainly performing the shifting operation in the shifting facilitation area.

In accordance with a thirteenth aspect of the present invention, the bicycle sprocket according to the twelfth aspect is configured so that the first upshifting recess depth is larger than the second upshifting recess depth.

With the bicycle sprocket according to the thirteenth aspect, it is possible to certainly perform the shifting operation in the shifting facilitation area.

In accordance with a fourteenth aspect of the present invention, the bicycle sprocket according to any one of the eleventh to thirteenth aspects is configured so that the at least one first axially recessed downshifting-facilitation tooth includes a first downshifting-facilitation tooth and a first additional downshifting-facilitation tooth. The first downshifting-facilitation tooth is recessed in the axial direction. The first additional downshifting-facilitation tooth is recessed in the axial direction and is adjacent to the first downshifting-facilitation tooth without another tooth therebetween in the circumferential direction. The first additional downshifting-facilitation tooth is provided on a downstream side of the first downshifting-facilitation tooth in the rotational driving direction. The plurality of recess depths includes a first downshifting recess depth and a second downshifting recess depth. The first downshifting recess depth is defined from the second axially-facing surface of the sprocket body in the axial direction. The second downshifting recess depth is defined from the second axially-facing surface of the sprocket body in the axial direction. The second downshifting recess depth is different from the first downshifting recess depth. The first downshifting-facilitation tooth at least partly has the first downshifting recess depth. The first additional downshifting-facilitation tooth at least partly has the second downshifting recess depth.

With the bicycle sprocket according to the fourteenth aspect, it is possible to maintain strength of the bicycle sprocket in the shifting facilitation area with certainly performing the shifting operation in the shifting facilitation area.

In accordance with a fifteenth aspect of the present invention, the bicycle sprocket according to the fourteenth aspect is configured so that the first downshifting recess depth is larger than the second downshifting recess depth.

With the bicycle sprocket according to the fifteenth aspect, it is possible to certainly perform the shifting operation in the shifting facilitation area.

In accordance with a sixteenth aspect of the present invention, the bicycle sprocket according to any one of the twelfth to fifteenth aspects is configured so that the plurality of recess depths includes a third upshifting recess depth defined from the second axially-facing surface of the sprocket body in the axial direction. The third upshifting recess depth is different from the first upshifting recess depth. The first upshifting-facilitation tooth partly has the third upshifting recess depth.

With the bicycle sprocket according to the sixteenth aspect, it is possible to maintain strength of the bicycle sprocket in the shifting facilitation area with certainly performing the shifting operation in the shifting facilitation area.

In accordance with a seventeenth aspect of the present invention, the bicycle sprocket according to the sixteenth aspect is configured so that the third upshifting recess depth is larger than the second upshifting recess depth.

With the bicycle sprocket according to the seventeenth aspect, it is possible to maintain strength of the bicycle sprocket in the shifting facilitation area with certainly performing the shifting operation in the shifting facilitation area.

In accordance with an eighteenth aspect of the present invention, the bicycle sprocket according to the fourth aspect is configured so that the lastly chain-engaging upshifting-facilitation tooth includes an upshifting recess provided on the same side as the first axially-facing surface.

With the bicycle sprocket according to the eighteenth aspect, it is possible to certainly perform the upshifting operation in the shifting facilitation area.

In accordance with a nineteenth aspect of the present invention, the bicycle sprocket according to the sixth aspect is configured so that the initially chain-engaging downshifting-facilitation tooth includes a downshifting recess provided on the same side as the first axially-facing surface.

With the bicycle sprocket according to the nineteenth aspect, it is possible to certainly perform the downshifting operation in the shifting facilitation area.

In accordance with a twentieth aspect of the present invention, a bicycle sprocket comprises a sprocket body and a plurality of sprocket teeth. The sprocket body has a first axially-facing surface and a second axially-facing surface with respect to a rotational center axis of the bicycle sprocket. The second axially-facing surface is opposite to the first axially-facing surface in an axial direction with respect to the rotational center axis. The first axially-facing surface is configured to face a center plane of a bicycle in an assembled state where the bicycle sprocket is mounted to the bicycle. The plurality of sprocket teeth extends radially outwardly from the sprocket body with respect to the rotational center axis. The plurality of sprocket teeth includes at least four axially recessed teeth with respect to the rotational center axis. The at least four axially recessed teeth are recessed from the second axially-facing surface toward the first axially-facing surface. The at least four axially recessed teeth provide a continuous recess extending in the circumferential direction. The twentieth aspect can be combined with any one of the first to nineteenth aspects.

With the bicycle sprocket according to the twentieth aspect, it is possible to save weight of the bicycle sprocket.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
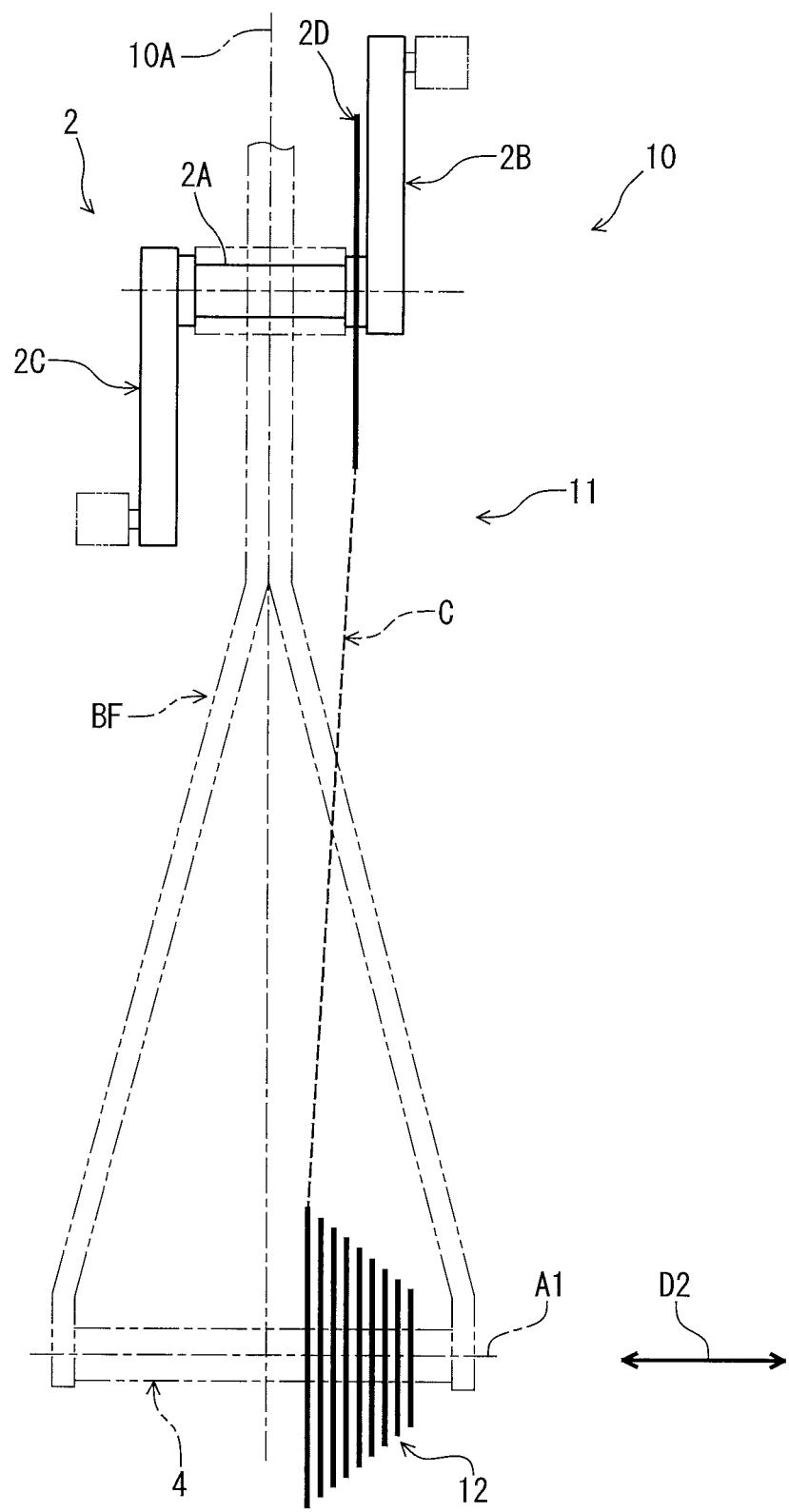
FIG. 1 is a schematic diagram of a bicycle including a bicycle drive train.

The embodiment(s) will now be described with reference to the accompanying drawings, wherein like reference numerals designate corresponding or identical elements throughout the various drawings.

Referring initially to FIG. 1, a bicycle 10 includes a bicycle frame BF and a bicycle drive train 11. The bicycle drive train 11 comprises a crank assembly 2, a hub assembly 4, a bicycle sprocket assembly 12, and a bicycle chain C. The bicycle sprocket assembly 12 has a rotational center axis A1. The bicycle sprocket assembly 12 is rotatably supported by the hub assembly 4 relative to the bicycle frame BF about the rotational center axis A1. The crank assembly 2 includes a crank axle 2A, a right crank arm 2B, a left crank arm 2C, and a front sprocket 2D. The right crank arm 2B and the left crank arm 2C are secured to the crank axle 2A. The front sprocket 2D is secured to at least one of the crank axle 2A and the right crank arm 2B. The bicycle chain C is engaged with the front sprocket 2D and the bicycle sprocket assembly 12 to transmit a pedaling force from the front sprocket 2D to the bicycle sprocket assembly 12. The crank assembly 2 includes the front sprocket 2D as a single sprocket in the illustrated embodiment. However, the crank assembly 2 can includes a plurality of front sprockets. The bicycle sprocket assembly 12 is a rear sprocket assembly. However, structures of the bicycle sprocket assembly 12 can be applied to the front sprocket.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket assembly 12, should be interpreted relative to the bicycle equipped with the bicycle sprocket assembly 12 as used in an upright riding position on a horizontal surface.

Figure 2:
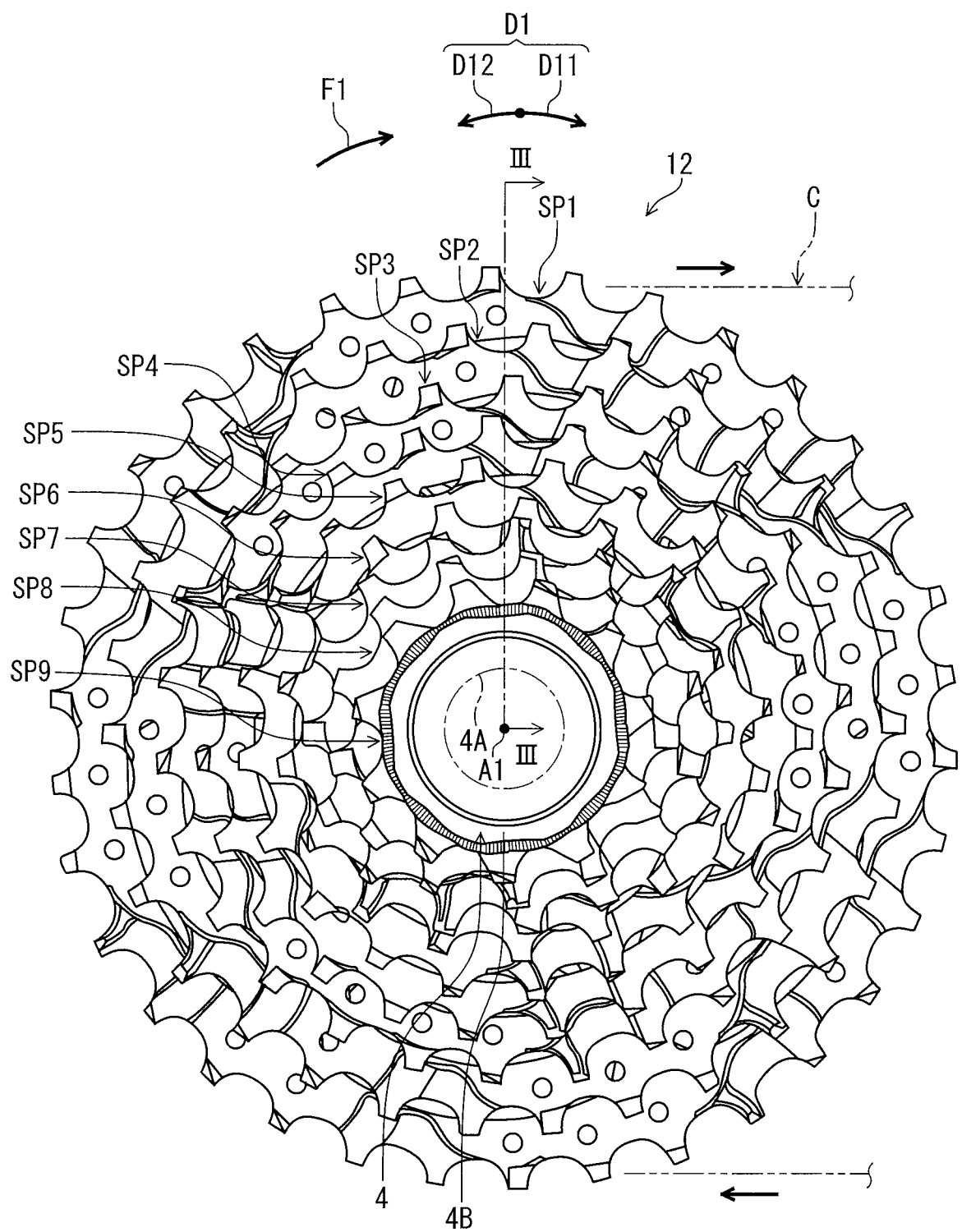
FIG. 2 is a side elevational view of a bicycle sprocket assembly of the bicycle drive train illustrated in FIG. 1.

As seen in FIG. 2, the bicycle sprocket assembly 12 is secured to a sprocket support body 4A of the hub assembly 4 with a lock member 4B in a mounting state where the bicycle sprocket assembly 12 is mounted to the hub assembly 4. The bicycle sprocket assembly 12 is configured to be engaged with the bicycle chain C to transmit a driving rotational force F1 between the bicycle chain C and the bicycle sprocket assembly 12 during pedaling. The bicycle sprocket assembly 12 is rotated about the rotational center axis A1 in a rotational driving direction D11 during pedaling. The rotational driving direction D11 is defined along a circumferential direction D1 with respect to the rotational center axis A1 of the bicycle sprocket assembly 12. A reverse rotational direction D12 is an opposite direction of the rotational driving direction D11 and is defined along the circumferential direction D1.

The bicycle sprocket assembly 12 includes a bicycle sprocket. In this embodiment, the bicycle sprocket assembly 12 includes a plurality of bicycle sprockets SP1 to SP9. The bicycle sprocket SP1 corresponds to a low gear. The bicycle sprocket SP9 corresponds to a top gear. A total number of the plurality of bicycle sprockets SP1 to SP9 is not limited to this embodiment.

Figure 3:
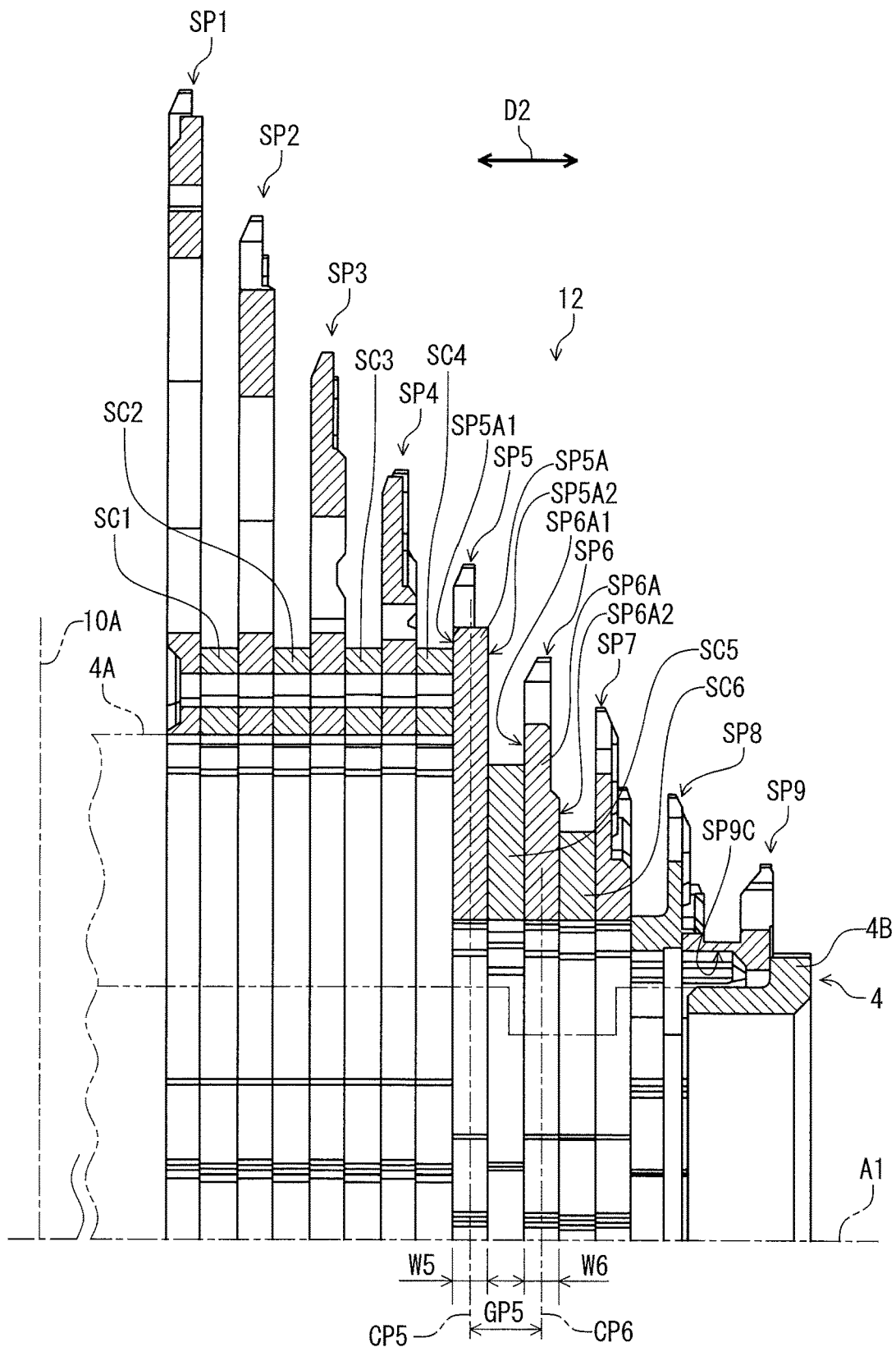
FIG. 3 is a partial cross-sectional view of the bicycle sprocket assembly taken along line of FIG. 2.

As seen in FIG. 3, the bicycle sprockets SP1 to SP9 are arranged at respective gear pitches in an axial direction D2 with respect to the rotational center axis A1. The bicycle sprocket assembly 12 comprises a plurality of spacers SC1 to SC6. The spacer SC1 is provided between the bicycle sprockets SP1 and SP2 in the axial direction D2. The spacer SC2 is provided between the bicycle sprockets SP2 and SP3 in the axial direction D2. The spacer SC3 is provided between the bicycle sprockets SP3 and SP4 in the axial direction D2. The spacer SC4 is provided between the bicycle sprockets SP4 and SP5 in the axial direction D2. The spacer SC5 is provided between the bicycle sprockets SP5 and SP6 in the axial direction D2. The spacer SC6 is provided between the bicycle sprockets SP6 and SP7 in the axial direction D2.

In this embodiment, the bicycle sprockets SP1 to SP9 and the spacers SC1 to SC6 are separate members from each other. However, at least one of the bicycle sprockets SP1 to SP9 and the spacers SC1 to SC6 can be integrally provided with another member of the bicycle sprockets SP1 to SP9 and the spacers SC1 to SC6 as a one-piece unitary member.

Figure 4:
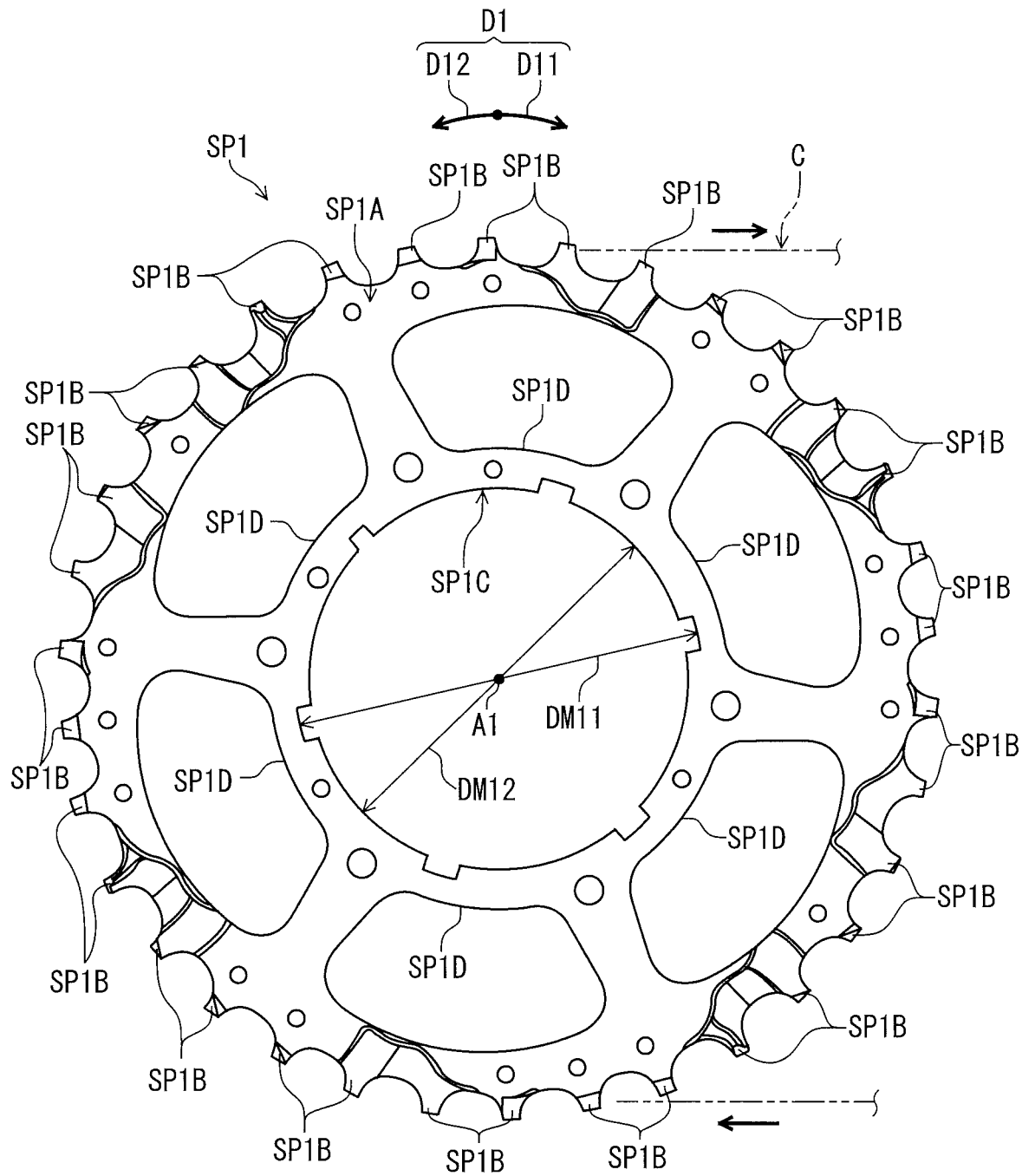
FIG. 4 is a side elevational view of a bicycle sprocket of the bicycle sprocket assembly illustrated in FIG. 2.

As seen in FIG. 4, the bicycle sprocket SP1 comprises a sprocket body SP1A and a plurality of sprocket teeth SP1B. The plurality of sprocket teeth SP1B extends radially outwardly from the sprocket body SP1A with respect to the rotational center axis A1. The sprocket body SP1A includes an internal splined opening SP1C configured to engage with the hub assembly 4 (FIG. 3). The internal splined opening SP1C has an internal-spline major diameter DM11 and an internal-spline minor diameter DM12. In this embodiment, the internal-spline major diameter DM11 is 64.2 mm, and the internal-spline minor diameter DM12 is 60.3 mm. However, the internal-spline major diameter DM11 and the internal-spline minor diameter DM12 are not limited to this embodiment. A total number of splines of the internal splined opening SP1C is 6 in this embodiment. However, the total number of the splines of the internal splined opening SP1C is not limited to this embodiment. The sprocket body SP1A includes a plurality of openings SP1D. At least one of the internal splined opening SP1C and the openings SP1D can be omitted from the sprocket body SP1A.

Figure 5:
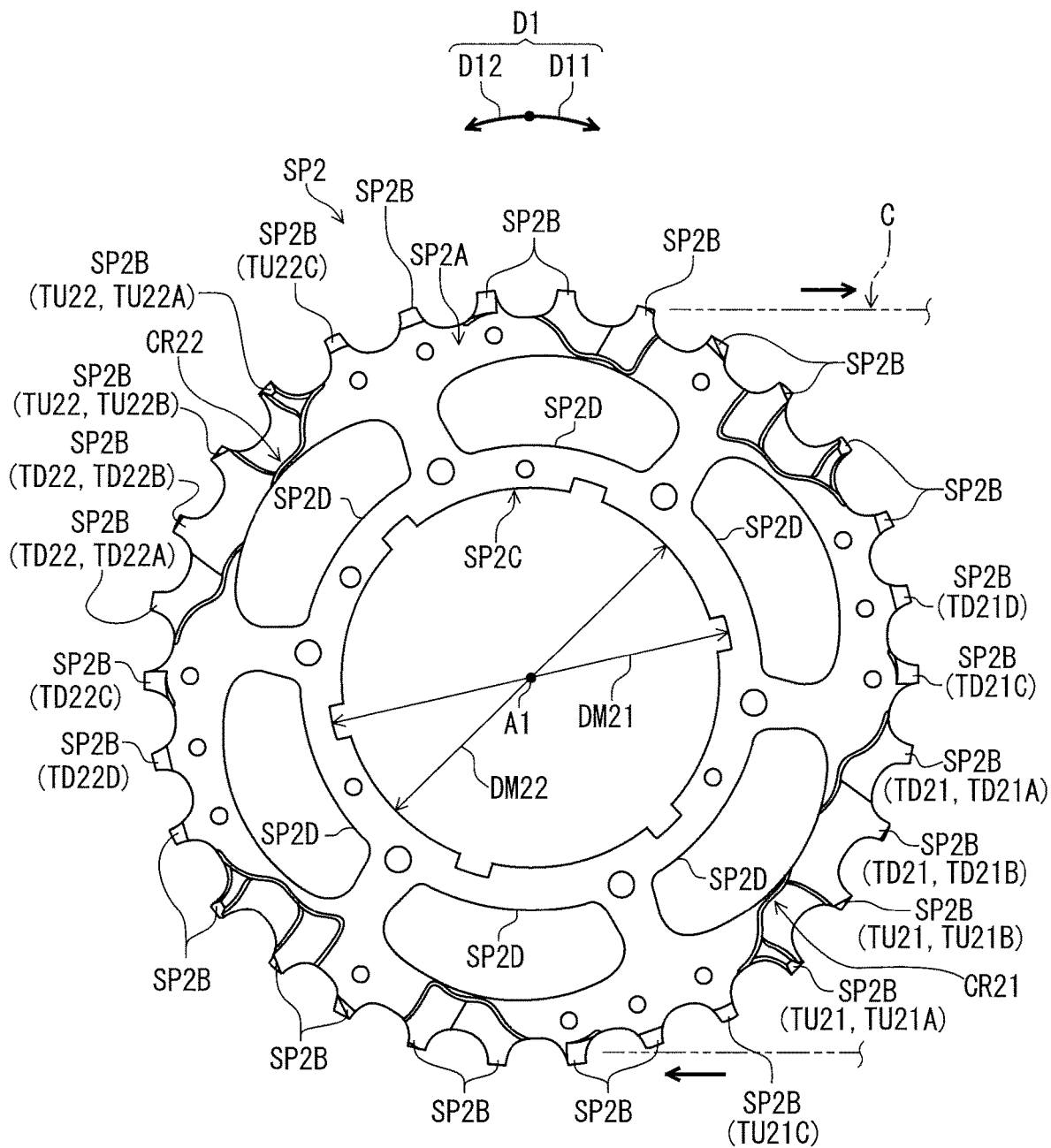
FIG. 5 is a side elevational view of a bicycle sprocket of the bicycle sprocket assembly illustrated in FIG. 2.

As seen in FIG. 5, the bicycle sprocket SP2 comprises a sprocket body SP2A and a plurality of sprocket teeth SP2B. The plurality of sprocket teeth SP2B extends radially outwardly from the sprocket body SP2A with respect to the rotational center axis A1. The sprocket body SP2A includes an internal splined opening SP2C configured to engage with the hub assembly 4 (FIG. 3). The internal splined opening SP2C has an internal-spline major diameter DM21 and an internal-spline minor diameter DM22. In this embodiment, the internal-spline major diameter DM21 is 64.2 mm, and the internal-spline minor diameter DM22 is 60.3 mm. However, the internal-spline major diameter DM21 and the internal-spline minor diameter DM22 are not limited to this embodiment. A total number of splines of the internal splined opening SP2C is 6 in this embodiment. However, the total number of the splines of the internal splined opening SP2C is not limited to this embodiment. The sprocket body SP2A includes a plurality of openings SP2D. At least one of the internal splined opening SP2C and the openings SP2D can be omitted from the sprocket body SP2A.

Figure 6:
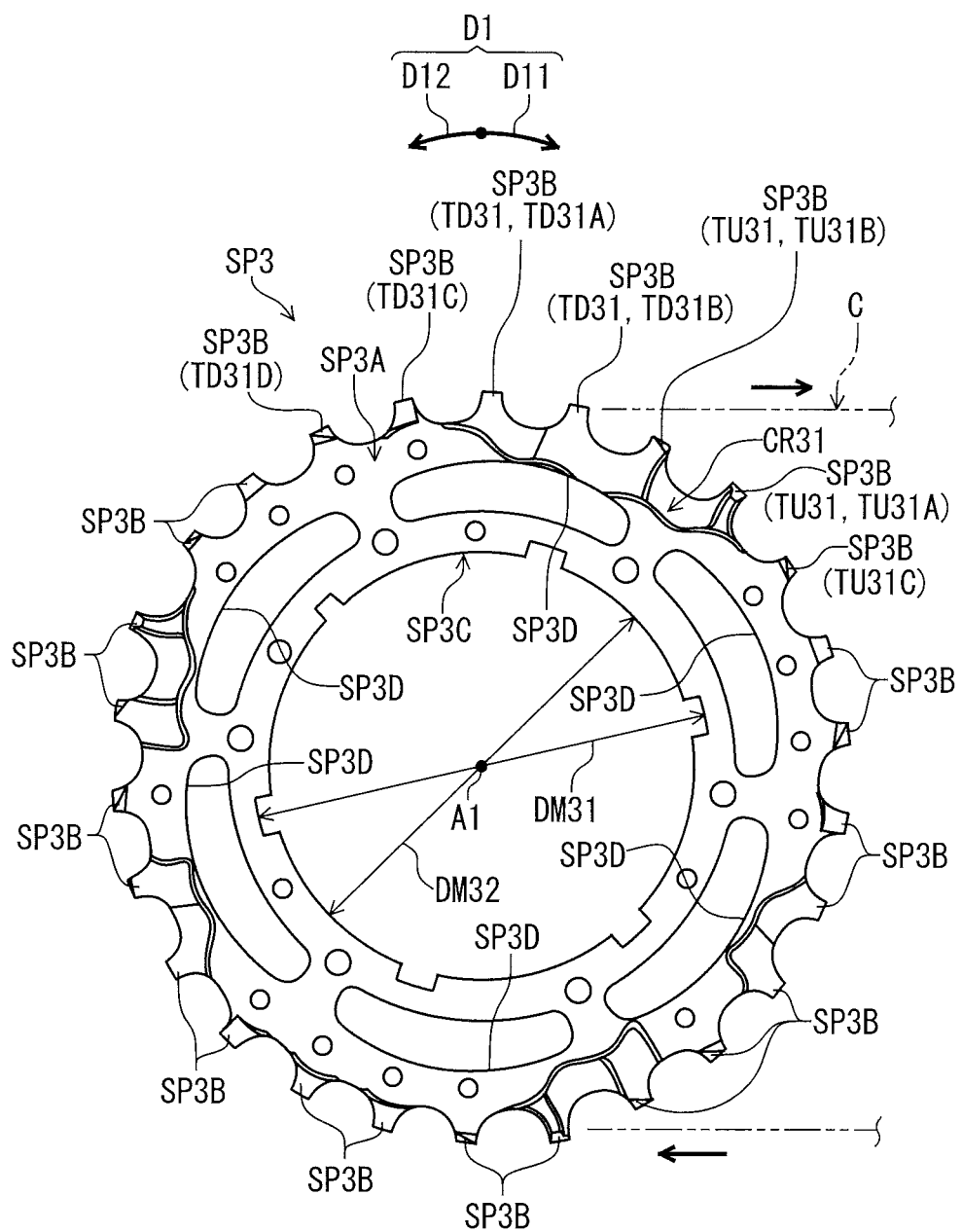
FIG. 6 is a side elevational view of a bicycle sprocket of the bicycle sprocket assembly illustrated in FIG. 2.

As seen in FIG. 6, the bicycle sprocket SP3 comprises a sprocket body SP3A and a plurality of sprocket teeth SP3B. The plurality of sprocket teeth SP3B extends radially outwardly from the sprocket body SP3A with respect to the rotational center axis A1. The sprocket body SP3A includes an internal splined opening SP3C configured to engage with the hub assembly 4 (FIG. 3). The internal splined opening SP3C has an internal-spline major diameter DM31 and an internal-spline minor diameter DM32. In this embodiment, the internal-spline major diameter DM31 is 64.2 mm, and the internal-spline minor diameter DM32 is 60.3 mm. However, the internal-spline major diameter DM31 and the internal-spline minor diameter DM32 are not limited to this embodiment. A total number of splines of the internal splined opening SP3C is 6 in this embodiment. However, the total number of the splines of the internal splined opening SP3C is not limited to this embodiment. The sprocket body SP3A includes a plurality of openings SP3D. At least one of the internal splined opening SP3C and the openings SP3D can be omitted from the sprocket body SP3A.

Figure 7:
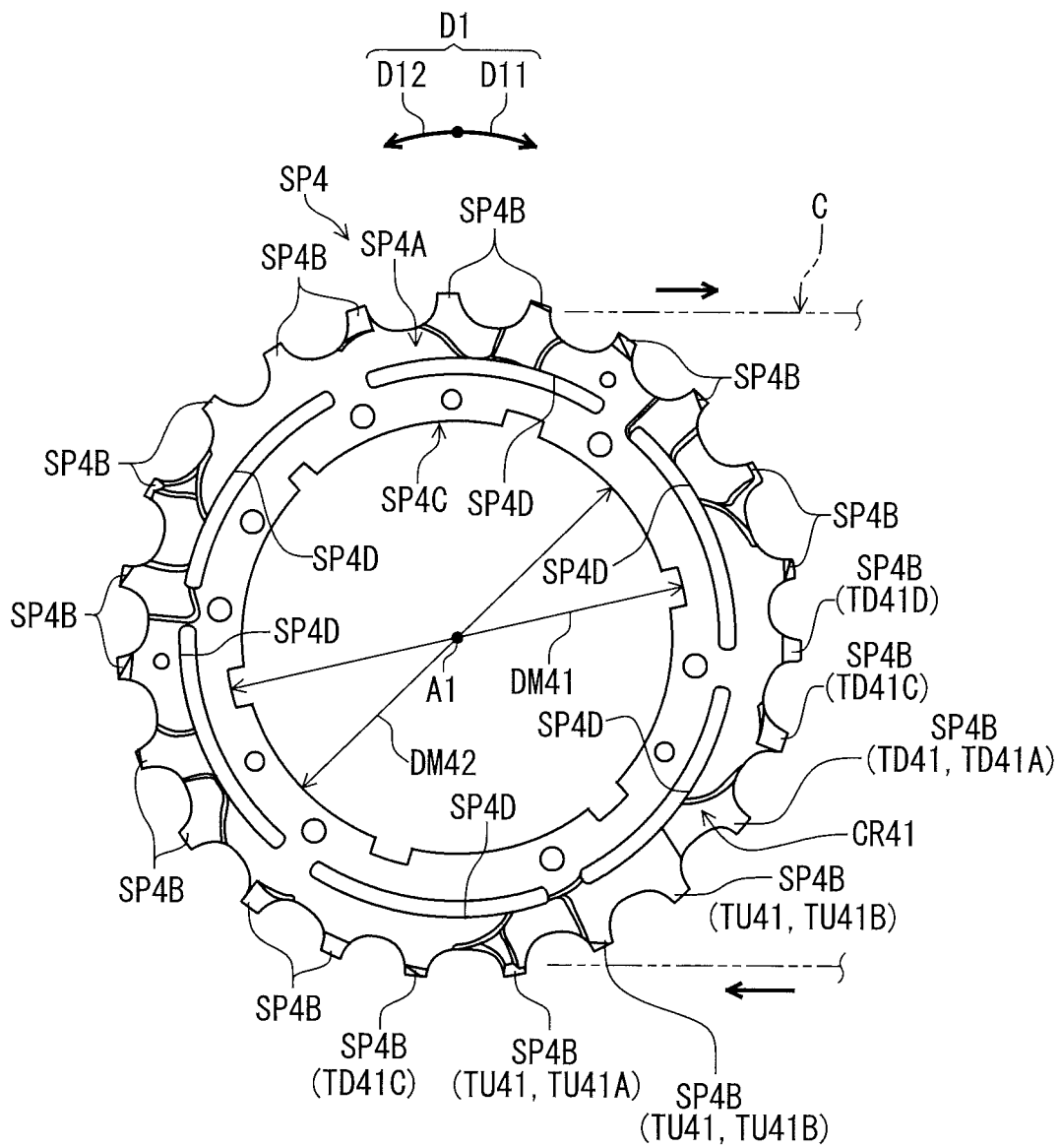
FIG. 7 is a side elevational view of a bicycle sprocket of the bicycle sprocket assembly illustrated in FIG. 2.

As seen in FIG. 7, the bicycle sprocket SP4 comprises a sprocket body SP4A and a plurality of sprocket teeth SP4B. The plurality of sprocket teeth SP4B extends radially outwardly from the sprocket body SP4A with respect to the rotational center axis A1. The sprocket body SP4A includes an internal splined opening SP4C configured to engage with the hub assembly 4 (FIG. 3). The internal splined opening SP4C has an internal-spline major diameter DM41 and an internal-spline minor diameter DM42. In this embodiment, the internal-spline major diameter DM41 is 64.2 mm, and the internal-spline minor diameter DM42 is 60.3 mm. However, the internal-spline major diameter DM41 and the internal-spline minor diameter DM42 are not limited to this embodiment. A total number of splines of the internal splined opening SP4C is 6 in this embodiment. However, the total number of the splines of the internal splined opening SP4C is not limited to this embodiment. The sprocket body SP4A includes a plurality of openings SP4D. At least one of the internal splined opening SP4C and the openings SP4D can be omitted from the sprocket body SP4A.

Figure 8:
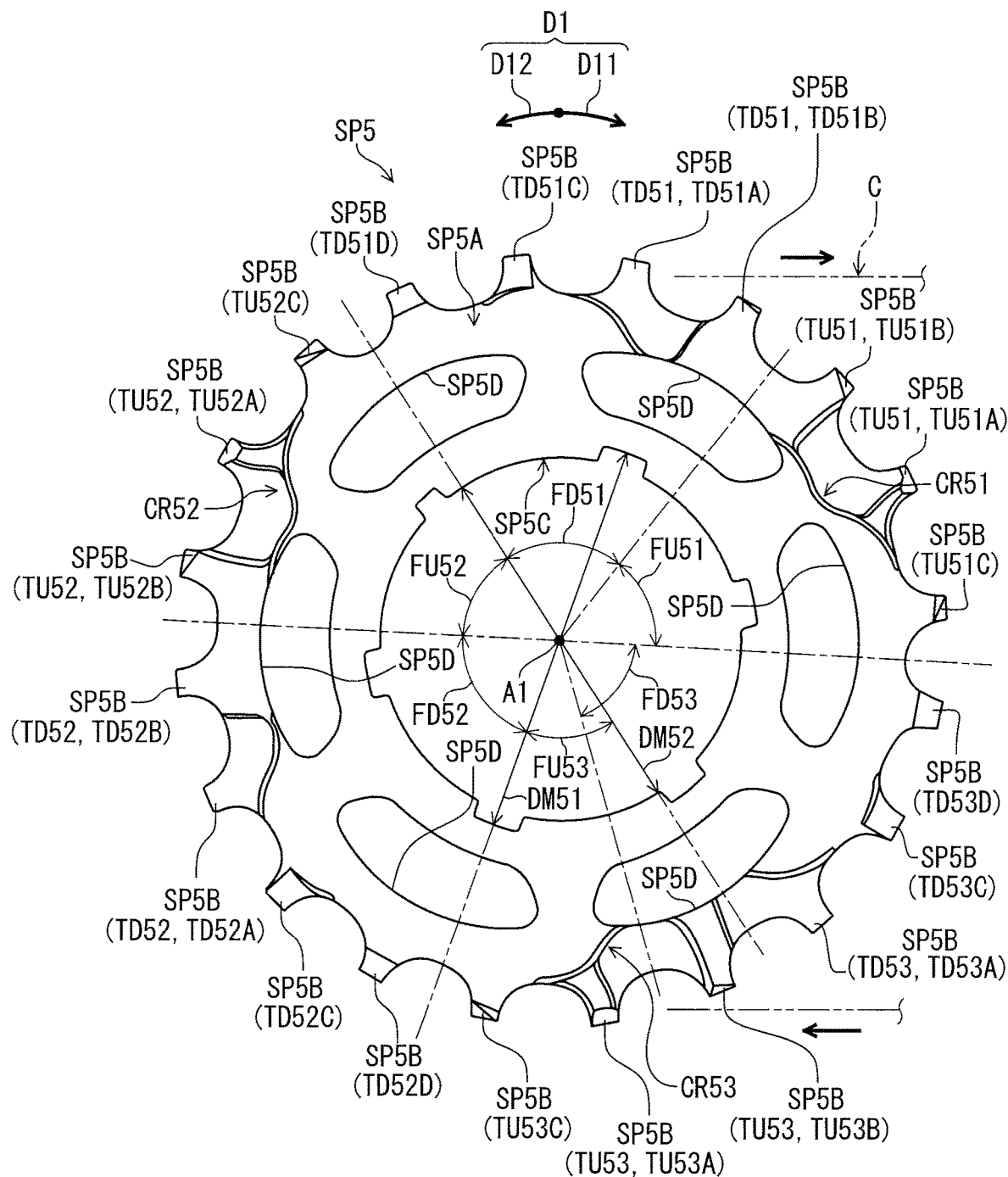
FIG. 8 is a side elevational view of a bicycle sprocket of the bicycle sprocket assembly illustrated in FIG. 2.

As seen in FIG. 8, the bicycle sprocket SP5 comprises a sprocket body SP5A and a plurality of sprocket teeth SP5B. The plurality of sprocket teeth SP5B extends radially outwardly from the sprocket body SP5A with respect to the rotational center axis A1. The sprocket body SP5A includes an internal splined opening SP5C configured to engage with the hub assembly 4 (FIG. 3). The internal splined opening SP5C has an internal-spline major diameter DM51 and an internal-spline minor diameter DM52. In this embodiment, the internal-spline major diameter DM51 is 41.7 mm, and the internal-spline minor diameter DM52 is 38.3 mm. However, the internal-spline major diameter DM51 and the internal-spline minor diameter DM52 are not limited to this embodiment. A total number of splines of the internal splined opening SP5C is 6 in this embodiment. However, the total number of the splines of the internal splined opening SP5C is not limited to this embodiment. The sprocket body SP5A includes a plurality of openings SP5D. At least one of the internal splined opening SP5C and the openings SP5D can be omitted from the sprocket body SP5A.

Figure 9:
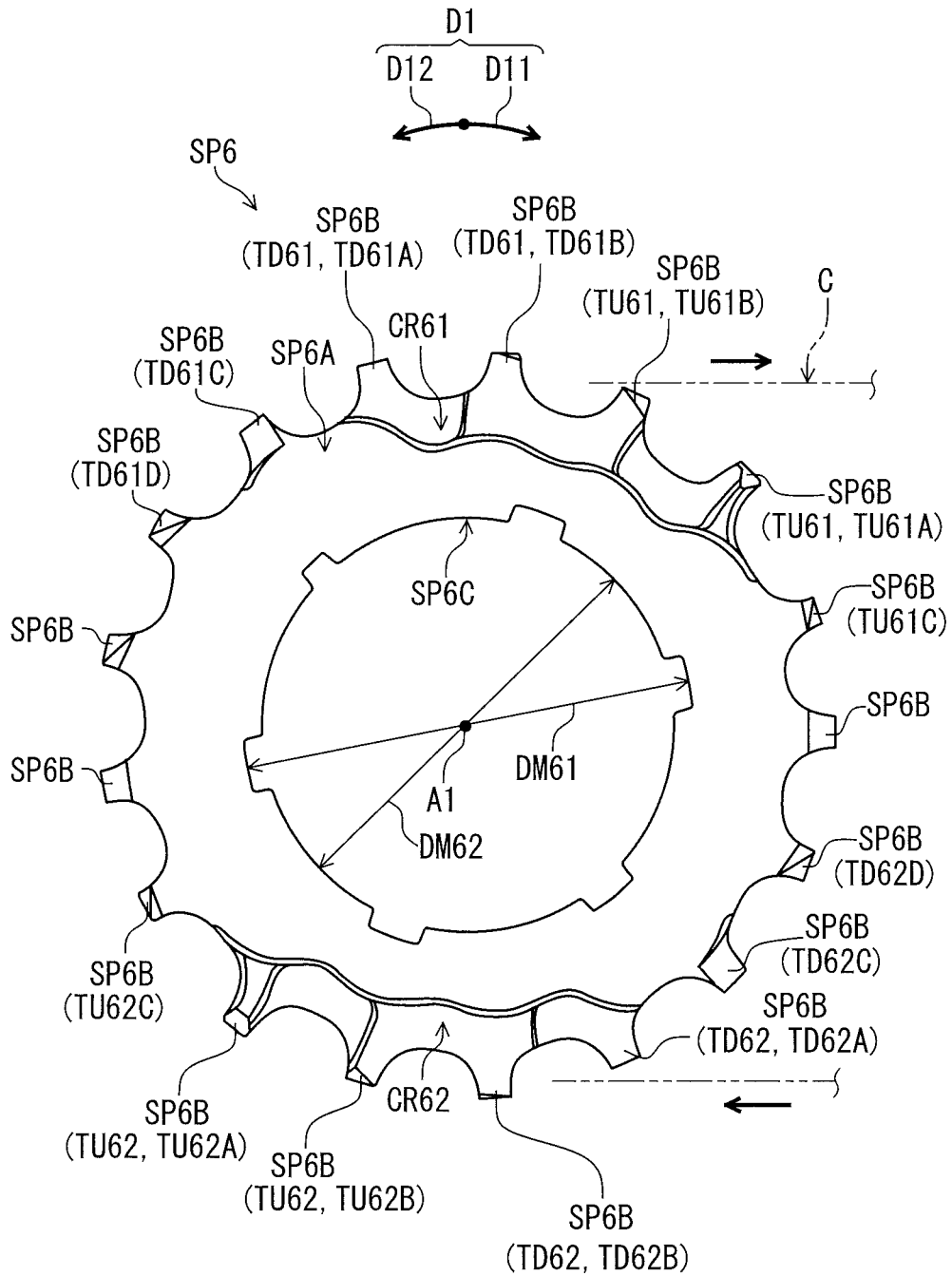
FIG. 9 is a side elevational view of a bicycle sprocket of the bicycle sprocket assembly illustrated in FIG. 2.

As seen in FIG. 9, the bicycle sprocket SP6 comprises a sprocket body SP6A and a plurality of sprocket teeth SP6B. The plurality of sprocket teeth SP6B extends radially outwardly from the sprocket body SP6A with respect to the rotational center axis A1. The sprocket body SP6A includes an internal splined opening SP6C configured to engage with the hub assembly 4 (FIG. 3). The internal splined opening SP6C has an internal-spline major diameter DM61 and an internal-spline minor diameter DM62. In this embodiment, the internal-spline major diameter DM61 is 41.7 mm, and the internal-spline minor diameter DM62 is 38.3 mm. However, the internal-spline major diameter DM61 and the internal-spline minor diameter DM62 are not limited to this embodiment. A total number of splines of the internal splined opening SP6C is 6 in this embodiment. However, the total number of the splines of the internal splined opening SP6C is not limited to this embodiment. The internal splined opening SP6C can be omitted from the sprocket body SP6A. The sprocket body SP6A can include at least one opening.

Figure 10:
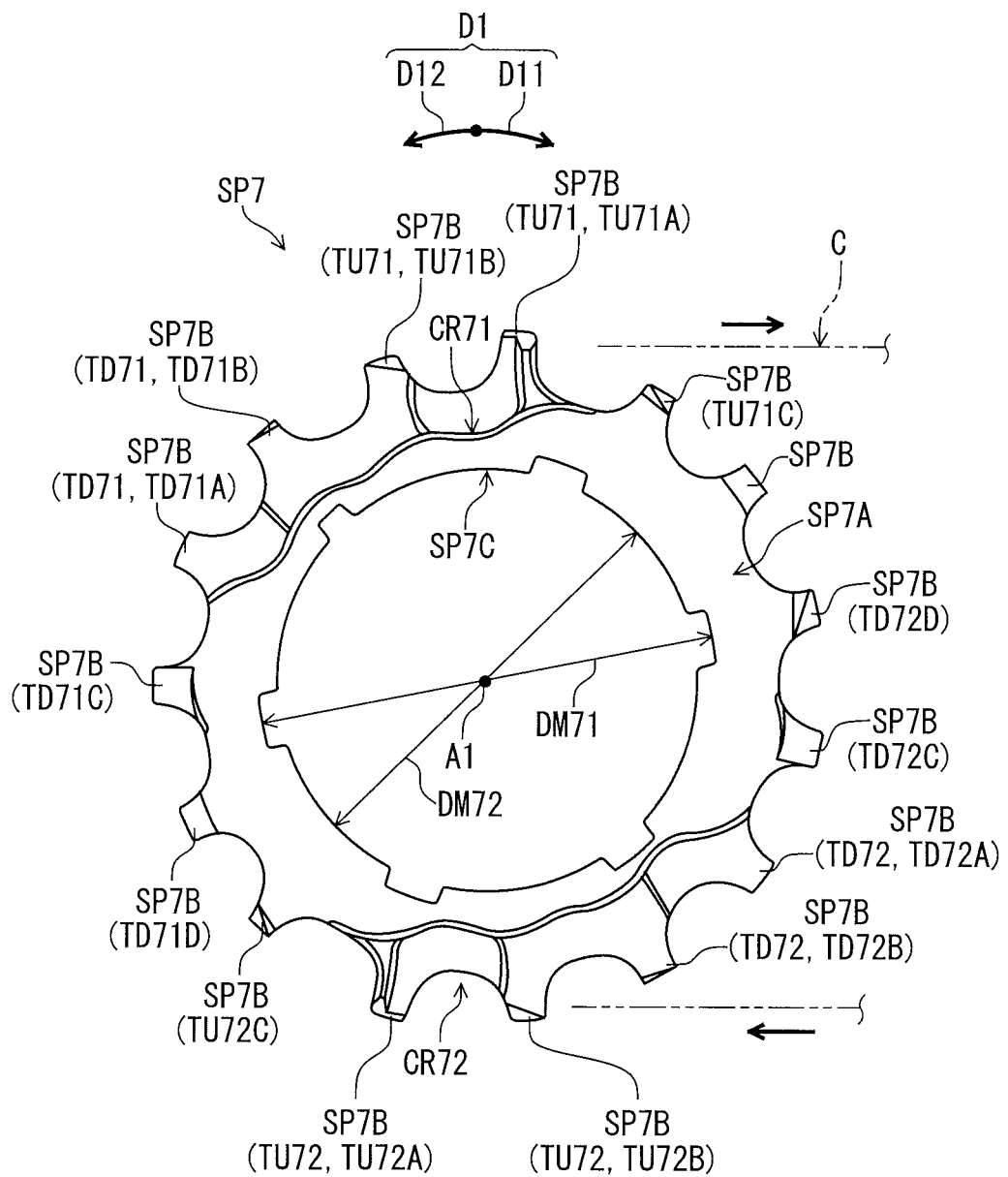
FIG. 10 is a side elevational view of a bicycle sprocket of the bicycle sprocket assembly illustrated in FIG. 2.

As seen in FIG. 10, the bicycle sprocket SP7 comprises a sprocket body SP7A and a plurality of sprocket teeth SP7B. The plurality of sprocket teeth SP7B extends radially outwardly from the sprocket body SP7A with respect to the rotational center axis A1. The sprocket body SP7A includes an internal splined opening SP7C configured to engage with the hub assembly 4 (FIG. 3). The internal splined opening SP7C has an internal-spline major diameter DM71 and an internal-spline minor diameter DM72. In this embodiment, the internal-spline major diameter DM71 is 41.7 mm, and the internal-spline minor diameter DM72 is 38.3 mm. However, the internal-spline major diameter DM71 and the internal-spline minor diameter DM72 are not limited to this embodiment. A total number of splines of the internal splined opening SP7C is 6 in this embodiment. However, the total number of the splines of the internal splined opening SP7C is not limited to this embodiment. The internal splined opening SP7C can be omitted from the sprocket body SP7A. The sprocket body SP7A can include at least one opening.

Figure 11:
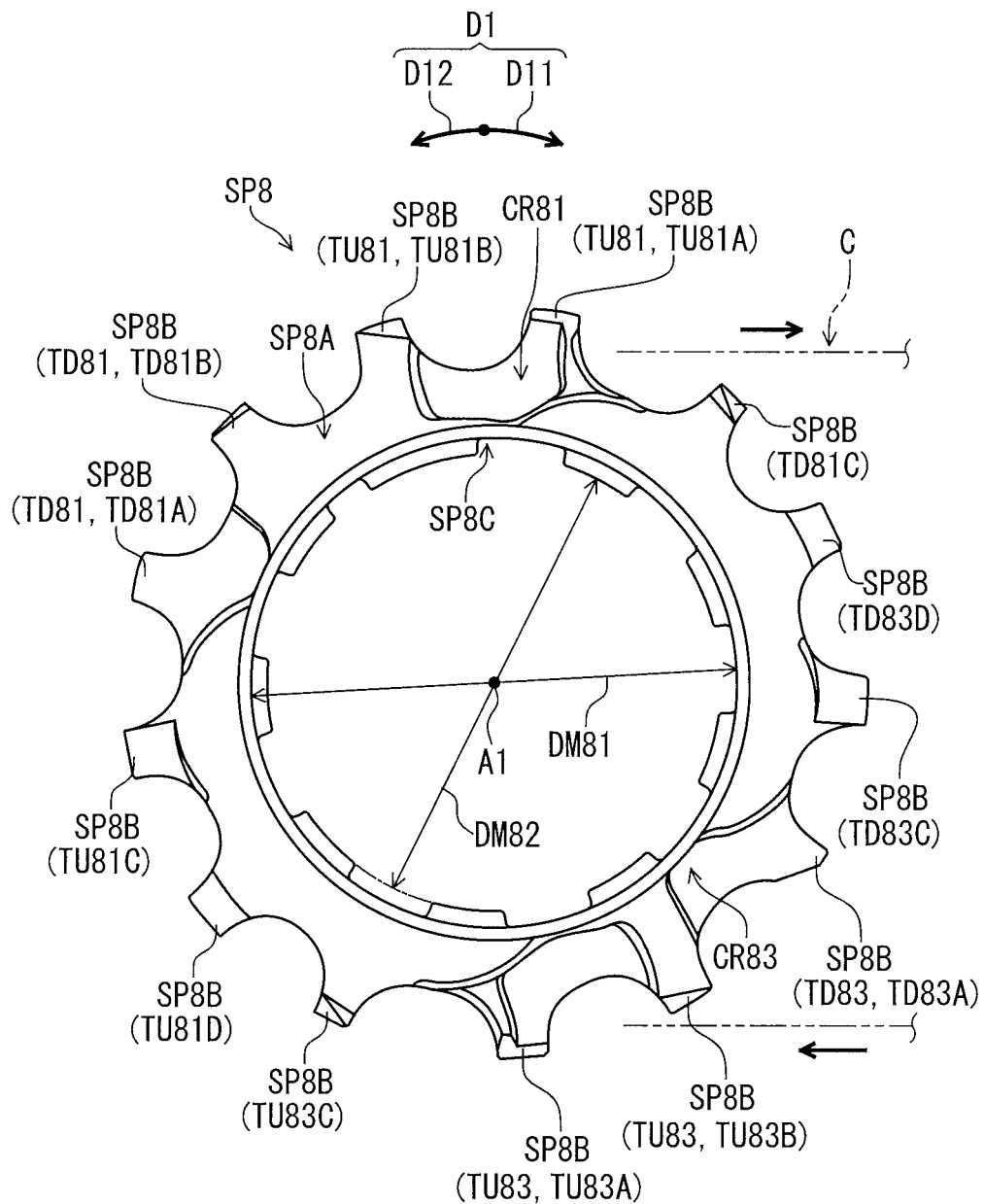
FIG. 11 is a side elevational view of a bicycle sprocket of the bicycle sprocket assembly illustrated in FIG. 2.

As seen in FIG. 11, the bicycle sprocket SP8 comprises a sprocket body SP8A and a plurality of sprocket teeth SP8B. The plurality of sprocket teeth SP8B extends radially outwardly from the sprocket body SP8A with respect to the rotational center axis A1. The sprocket body SP8A includes an internal splined opening SP8C configured to engage with the hub assembly 4 (FIG. 3). The internal splined opening SP8C has an internal-spline major diameter DM81 and an internal-spline minor diameter DM82. In this embodiment, the internal-spline major diameter DM81 is 41.7 mm, and the internal-spline minor diameter DM82 is 38.3 mm. However, the internal-spline major diameter DM81 and the internal-spline minor diameter DM82 are not limited to this embodiment. A total number of splines of the internal splined opening SP8C is 6 in this embodiment. However, the total number of the splines of the internal splined opening SP8C is not limited to this embodiment. The internal splined opening SP8C can be omitted from the sprocket body SP8A. The sprocket body SP8A can include at least one opening.

Figure 12:
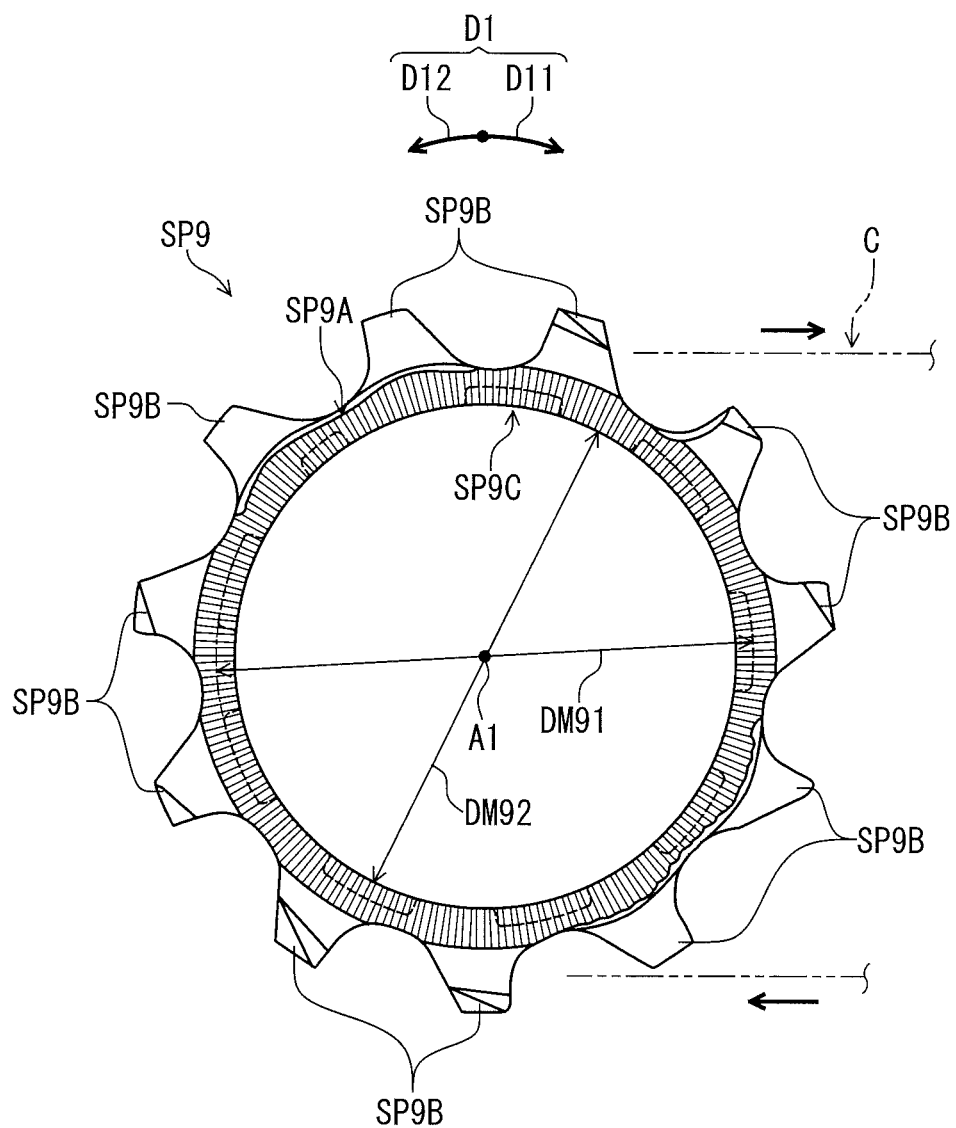
FIG. 12 is a side elevational view of a bicycle sprocket of the bicycle sprocket assembly illustrated in FIG. 2.

As seen in FIG. 12, the bicycle sprocket SP9 comprises a sprocket body SP9A and a plurality of sprocket teeth SP9B. The plurality of sprocket teeth SP9B extends radially outwardly from the sprocket body SP9A with respect to the rotational center axis A1. The sprocket body SP9A includes an internal splined opening SP9C configured to engage with the hub assembly 4 (FIG. 3). The internal splined opening SP9C has an internal-spline major diameter DM91 and an internal-spline minor diameter DM92. In this embodiment, the internal-spline major diameter DM91 is 41.7 mm, and the internal-spline minor diameter DM92 is 38.3 mm. However, the internal-spline major diameter DM91 and the internal-spline minor diameter DM92 are not limited to this embodiment. A total number of splines of the internal splined opening SP9C is 6 in this embodiment. However, the total number of the splines of the internal splined opening SP9C is not limited to this embodiment. The internal splined opening SP9C can be omitted from the sprocket body SP9A. The sprocket body SP9A can include at least one opening.

In this embodiment, the internal-spline major diameters DM11 to DM41 are equal to each other. The internal-spline minor diameters DM12 to DM42 are equal to each other. The internal-spline major diameters DM51 to DM91 are equal to each other. The internal-spline minor diameters DM52 to DM92 are equal to each other. However, at least one of the internal-spline major diameters DM11 to DM41 can be different from another of the internal-spline major diameters DM11 to DM41. At least one of the internal-spline minor diameters DM12 to DM42 can be different from another of the internal-spline minor diameters DM12 to DM42. At least one of the internal-spline major diameters DM51 to DM91 can be different from another of the internal-spline major diameters DM51 to DM91. At least one of the internal-spline minor diameters DM52 to DM92 can be different from another of the internal-spline minor diameters DM52 to DM92. Furthermore, in this embodiment, the internal-spline major diameters DM11 to DM41 are different from the internal-spline major diameters DM51 to DM91. The internal-spline minor diameters DM12 to DM42 are different from the internal-spline minor diameters DM52 to DM92. However, the internal-spline major diameters DM11 to DM41 can be equal to the internal-spline major diameters DM51 to DM91. The internal-spline minor diameters DM12 to DM42 can be equal to the internal-spline minor diameters DM52 to DM92.

The bicycle sprockets SP1 to SP9 have substantially the same structures as each other. Thus, the bicycle sprocket SP5 will be described in detail, and the bicycle sprockets SP1 to SP4 and SP6 to SP9 will not be described in detail here for the sake of brevity whereas what is described below concerning the bicycle sprocket SP5 can be applied to the bicycle sprockets SP1 to SP4 and SP6 to SP9.

Figure 13:
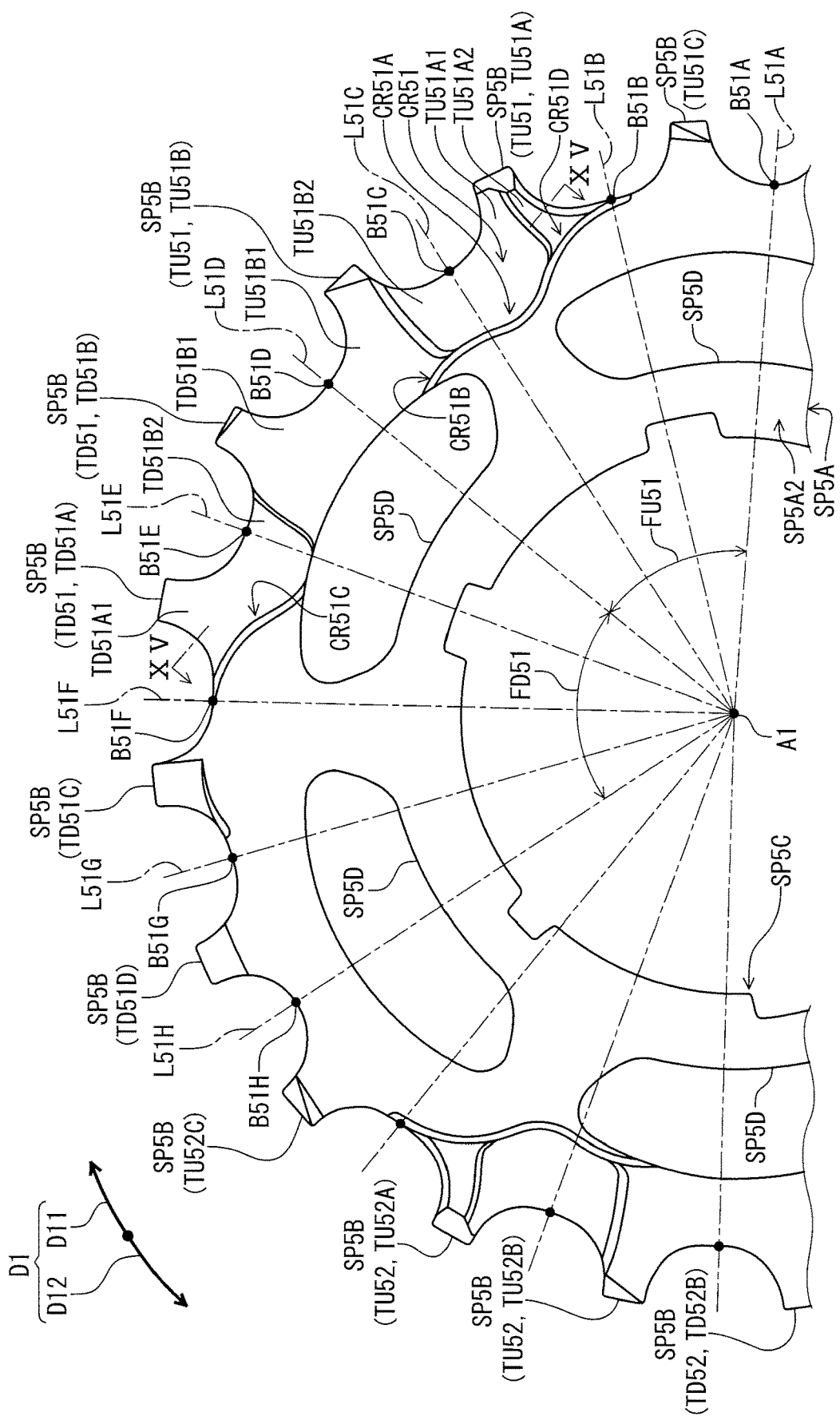
FIG. 13 is a partial side elevational view of the bicycle sprocket illustrated in FIG. 8.

As seen in FIG. 13, the plurality of sprocket teeth SP5B includes at least one first axially recessed upshifting-facilitation tooth TU51 with respect to the rotational center axis A1. The plurality of sprocket teeth SP5B includes at least one first axially recessed downshifting-facilitation tooth TD51 with respect to the rotational center axis A1.

The at least one first axially recessed downshifting-facilitation tooth TD51 is adjacent to the at least one first axially recessed upshifting-facilitation tooth TU51 without another tooth therebetween in the circumferential direction D1 with respect to the rotational center axis A1. The at least one first axially recessed downshifting-facilitation tooth TD51 is provided on an upstream side of the at least one first axially recessed upshifting-facilitation tooth TU51 in the rotational driving direction D11 of the bicycle sprocket SP5. However, the at least one first axially recessed downshifting-facilitation tooth TD51 can be provided on a downstream side of the at least one first axially recessed upshifting-facilitation tooth TU51 in the rotational driving direction D11 of the bicycle sprocket SP5.

As seen in FIG. 3, the sprocket body SP5A has a first axially-facing surface SP5A1 and a second axially-facing surface SP5A2 with respect to the rotational center axis A1 of the bicycle sprocket SP5. The second axially-facing surface SP5A2 is opposite to the first axially-facing surface SP5A1 in the axial direction D2 with respect to the rotational center axis A1. The first axially-facing surface SP5A1 is configured to face a center plane 10A of the bicycle 10 in an assembled state where the bicycle sprocket SP5 is mounted to the bicycle 10. The center plane 10A is defined to be perpendicular to the rotational center axis A1. As seen in FIG. 1, for example, the center plane 10A is defined at a transverse center of the bicycle frame BF.

As seen in FIG. 3, the sprocket body SP6A has a first axially-facing surface SP6A1 and a second axially-facing surface SP6A2 with respect to the rotational center axis A1 of the bicycle sprocket SP6. The second axially-facing surface SP6A2 is opposite to the first axially-facing surface SP6A1 in the axial direction D2 with respect to the rotational center axis A1. The first axially-facing surface SP6A1 is configured to face the center plane 10A of the bicycle 10 in an assembled state where the bicycle sprocket SP6 is mounted to the bicycle 10. The second axially-facing surface SP5A2 of the bicycle sprocket SP5 faces toward the first axially-facing surface SP6A1 of the bicycle sprocket SP6 in the axial direction D2. The spacer SC5 is provided between the second axially-facing surface SP5A2 of the bicycle sprocket SP5 and the first axially-facing surface SP6A1 of the bicycle sprocket SP6 in the axial direction D2.

The sprocket body SP5A has an axial width W5 defined from the first axially-facing surface SP5A1 to the second axially-facing surface SP5A2 in the axial direction D2. The axial width W5 ranges from 1.7 mm to 2 mm. In this embodiment, the axial width W5 is 1.9 mm. However, the axial width W5 is not limited to this embodiment and the above range.

The sprocket body SP6A has an axial width W6 defined from the first axially-facing surface SP6A1 to the second axially-facing surface SP6A2 in the axial direction D2. The axial width W6 ranges from 1.7 mm to 2 mm. In this embodiment, the axial width W6 is 1.9 mm. However, the axial width W6 is not limited to this embodiment and the above range.

The bicycle sprocket SP5 has an axial center plane CP5 defined to bisect the axial width W5. The axial center plane CP5 is defined to be perpendicular to the rotational center axis A1. The bicycle sprocket SP6 has an axial center plane CP6 defined to bisect the axial width W6. The axial center plane CP6 is defined to be perpendicular to the rotational center axis A1.

A gear pitch GP5 is defined between the axial center planes CP5 and CP6 in the axial direction D2. The gear pitch GP5 ranges 3.5 mm to 5 mm. In this embodiment, the gear pitch GP5 is 4.1 mm. However, the gear pitch GP5 is not limited to this embodiment and the above range.

The bicycle sprockets SP1 to SP4 and SP7 to SP9 have substantially the same axial width as the axial widths W5 and W6 of the bicycle sprockets SP5 and SP6. The bicycle sprockets SP1 to SP4 and SP7 to SP9 have substantially the same gear pitch as the gear pitch GP5 of the bicycle sprockets SP5 and SP6. Thus, they will not be described in detail here for the sake of brevity.

Figure 14:
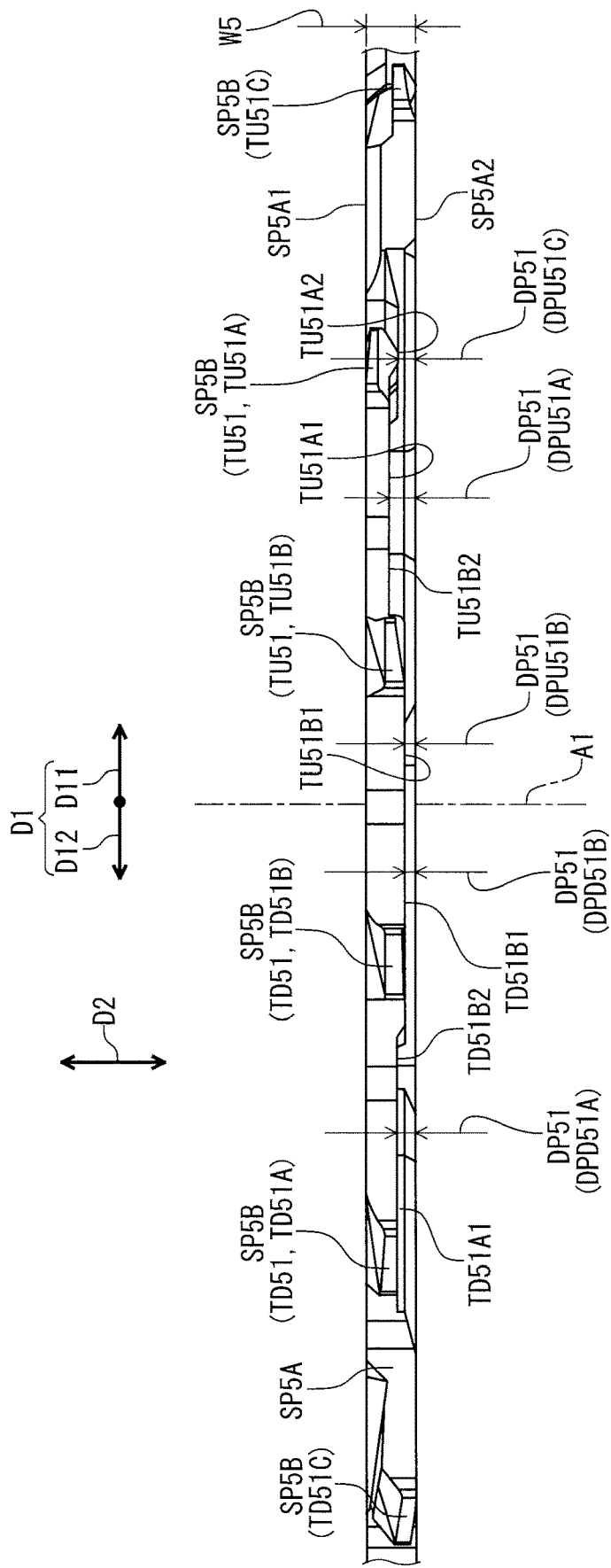
FIG. 14 is a partial top view of the bicycle sprocket illustrated in FIG. 8.

As seen in FIG. 14, the at least one first axially recessed upshifting-facilitation tooth TU51 is recessed from the second axially-facing surface SP5A2 toward the first axially-facing surface SP5A1. The at least one first axially recessed downshifting-facilitation tooth TD51 is recessed from the second axially-facing surface SP5A2 toward the first axially-facing surface SP5A1. The at least one first axially recessed upshifting-facilitation tooth TU51 is recessed from the second axially-facing surface SP5A2 toward the first axially-facing surface SP5A1 in the axial direction D2. The at least one first axially recessed downshifting-facilitation tooth TD51 is recessed from the second axially-facing surface SP5A2 toward the first axially-facing surface SP5A1 in the axial direction D2.

As seen in FIG. 13, the at least one first axially recessed upshifting-facilitation tooth TU51 includes a first upshifting-facilitation tooth TU51A and a first additional upshifting-facilitation tooth TU51B. The first additional upshifting-facilitation tooth TU51B is adjacent to the first upshifting-facilitation tooth TU51A without another tooth therebetween in the circumferential direction D1. The first additional upshifting-facilitation tooth TU51B is provided on an upstream side of the first upshifting-facilitation tooth TU51A in the rotational driving direction D11. However, the first additional upshifting-facilitation tooth TU51B can be provided on a downstream side of the first upshifting-facilitation tooth TU51A in the rotational driving direction D11. One of the first upshifting-facilitation tooth TU51A and the first additional upshifting-facilitation tooth TU51B can be omitted from the at least one first axially recessed upshifting-facilitation tooth TU51.

The first upshifting-facilitation tooth TU51A is configured to facilitate an upshifting operation in which the bicycle chain C is shifted from the bicycle sprocket SP5 to the smaller sprocket SP6 (FIG. 2). The first additional upshifting-facilitation tooth TU51B is configured to facilitate the upshifting operation. Specifically, the first upshifting-facilitation tooth TU51A is configured to reduce interference between the bicycle sprocket SP5 and the bicycle chain C in the upshifting operation. The first upshifting-facilitation tooth TU51A is configured to first derail the bicycle chain C from the bicycle sprocket SP5 in the upshifting operation. Specifically, the first upshifting-facilitation tooth TU51A is configured to first derail an inner link plate of the bicycle chain C from the bicycle sprocket SP5 in the upshifting operation. The first additional upshifting-facilitation tooth TU51B is configured to reduce interference between the bicycle sprocket SP5 and the bicycle chain C in the upshifting operation. Specifically, the first upshifting-facilitation tooth TU51B is configured to derail an outer link plate of the bicycle chain C from the bicycle sprocket SP5 in the upshifting operation.

Figure 15:
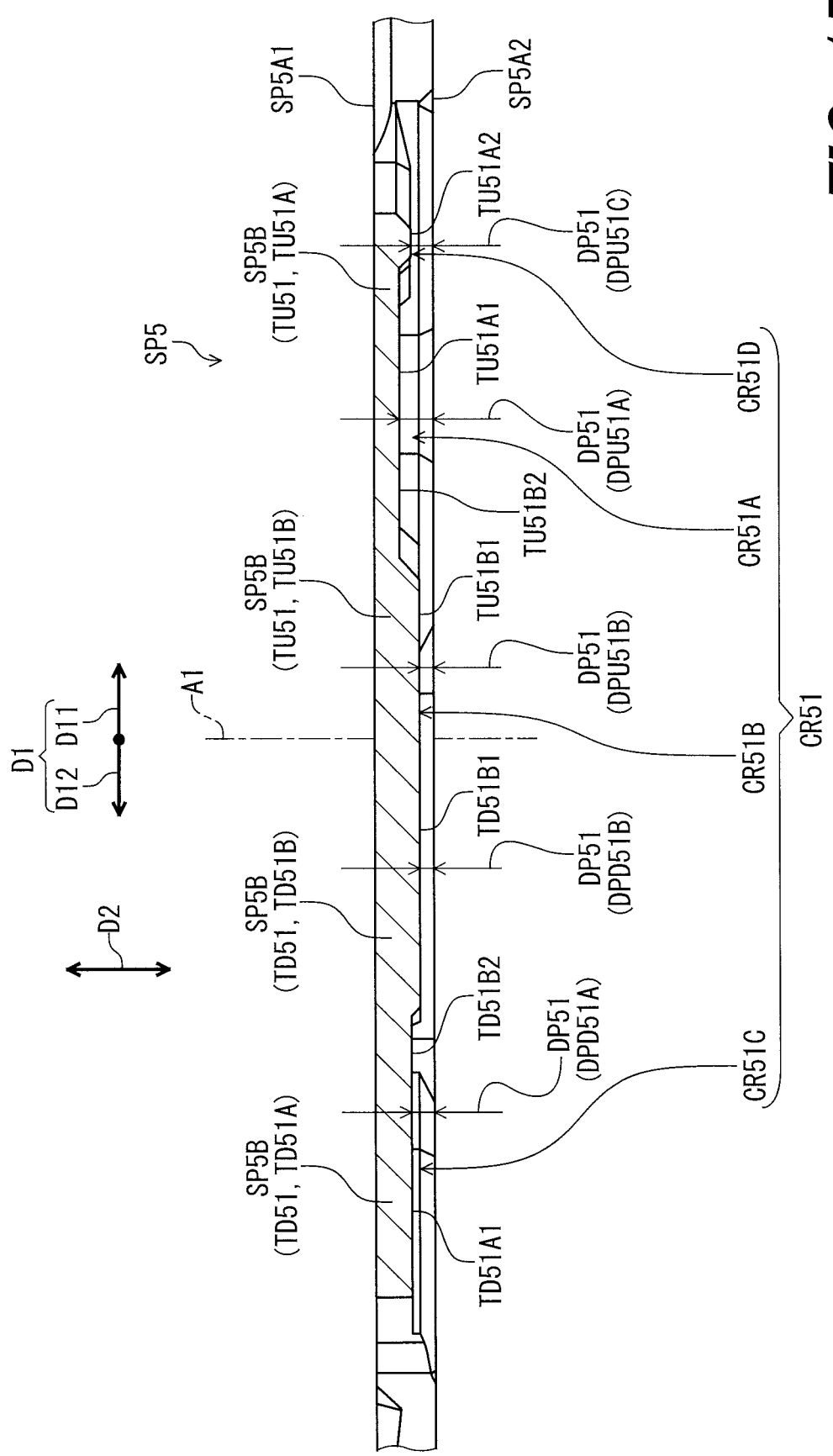
FIG. 15 is a partial cross-sectional view of the bicycle sprocket assembly taken along line XV-XV of FIG. 13.

As seen in FIG. 15, the first upshifting-facilitation tooth TU51A is recessed in the axial direction D2. The first additional upshifting-facilitation tooth TU51B is recessed in the axial direction D2. The first upshifting-facilitation tooth TU51A is recessed from the second axially-facing surface SP5A2 toward the first axially-facing surface SP5A1 in the axial direction D2. The first additional upshifting-facilitation tooth TU51B is recessed from the second axially-facing surface SP5A2 toward the first axially-facing surface SP5A1 in the axial direction D2.

As seen in FIG. 13, the at least one first axially recessed downshifting-facilitation tooth TD51 includes a first downshifting-facilitation tooth TD51A and a first additional downshifting-facilitation tooth TD51B. The first additional downshifting-facilitation tooth TD51B is adjacent to the first downshifting-facilitation tooth TD51A without another tooth therebetween in the circumferential direction D1. The first additional downshifting-facilitation tooth TD51B is provided on a downstream side of the first downshifting-facilitation tooth TD51A in the rotational driving direction D11. However, the first additional downshifting-facilitation tooth TD51B can be provided on an upstream side of the first downshifting-facilitation tooth TD51A in the rotational driving direction D11. One of the first downshifting-facilitation tooth TD51A and the first additional downshifting-facilitation tooth TD51B can be omitted from the at least one first axially recessed downshifting-facilitation tooth TD51.

In this embodiment, the first additional upshifting-facilitation tooth TU51B is adjacent to the first additional downshifting-facilitation tooth TD51B without another tooth therebetween in the circumferential direction D1. The first additional upshifting-facilitation tooth TU51B is provided on a downstream side of the first additional downshifting-facilitation tooth TD51B in the rotational driving direction D11. However, the positional relationship between the first additional upshifting-facilitation tooth TU51B and the first additional downshifting-facilitation tooth TD51B is not limited to this embodiment.

The first downshifting-facilitation tooth TD51A is configured to facilitate a downshifting operation in which the bicycle chain C is shifted from the smaller sprocket SP6 (FIG. 2) to the bicycle sprocket SP5. The first additional downshifting-facilitation tooth TD51B is configured to facilitate the downshifting operation. Specifically, the first downshifting-facilitation tooth TD51A is configured to reduce interference between the bicycle sprocket SP5 and the bicycle chain C in the downshifting operation. The first additional downshifting-facilitation tooth TD51B is configured to reduce interference between the bicycle sprocket SP5 and the bicycle chain C in the downshifting operation.

As seen in FIG. 15, the first downshifting-facilitation tooth TD51A is recessed in the axial direction D2. The first additional downshifting-facilitation tooth TD51B is recessed in the axial direction D2. The first downshifting-facilitation tooth TD51A is recessed from the second axially-facing surface SP5A2 toward the first axially-facing surface SP5A1 in the axial direction D2. The first additional downshifting-facilitation tooth TD51B is recessed from the second axially-facing surface SP5A2 toward the first axially-facing surface SP5A1 in the axial direction D2.

Figure 16:
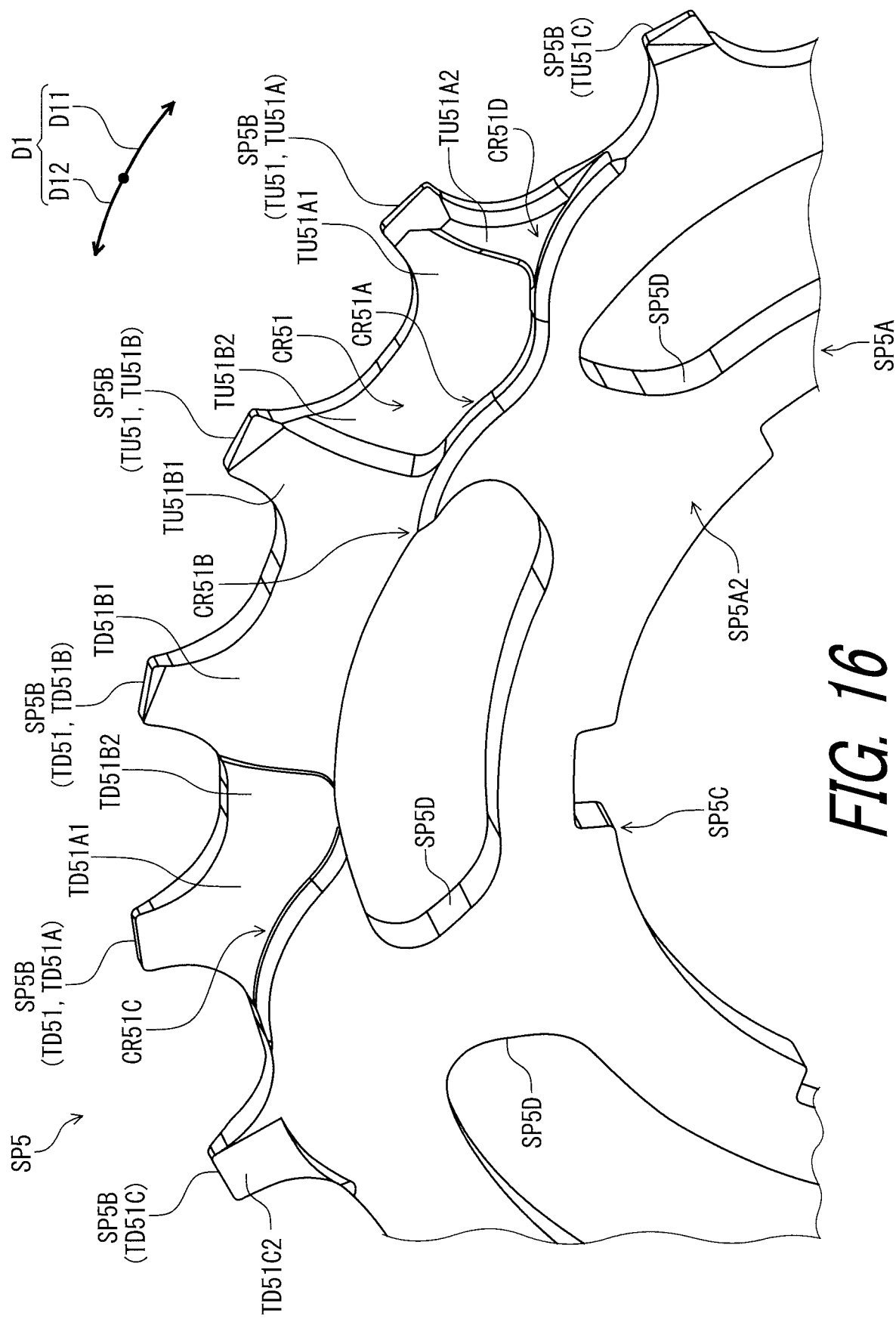
FIG. 16 is a partial perspective view of the bicycle sprocket illustrated in FIG. 8.

As seen in FIG. 16, the at least one first axially recessed upshifting-facilitation tooth TU51 and the at least one first axially recessed downshifting-facilitation tooth TD51 provide a first continuous recess CR51 extending in the circumferential direction D1. In this embodiment, the first continuous recess CR51 is provided on the second axially-facing surface SP5A2. The first continuous recess CR51 can be also referred to as a continuous recess CR51. The first upshifting-facilitation tooth TU51A, the first additional upshifting-facilitation tooth TU51B, the first downshifting-facilitation tooth TD51A, and the first additional downshifting-facilitation tooth TD51B provide the first continuous recess CR51. In other words, the plurality of sprocket teeth SP5B includes at least four axially recessed teeth TU51A, TU51B, TD51A, and TD51B with respect to the rotational center axis A1. The at least four axially recessed teeth TU51A, TU51B, TD51A, and TD51B are recessed from the second axially-facing surface SP5A2 toward the first axially-facing surface SP5A1. The at least four axially recessed teeth TU51A, TU51B, TD51A, and TD51B provide the continuous recess CR51 extending in the circumferential direction D1. The first continuous recess CR51 extends from the first downshifting-facilitation tooth TD51A to the first upshifting-facilitation tooth TU51A in the circumferential direction D1. However, the structure of the first continuous recess CR51 is not limited to this embodiment. At least two axially recessed teeth can provide the first continuous recess CR51 extending in the circumferential direction D1.

As seen in FIG. 13, the plurality of sprocket teeth SP5B includes a lastly chain-engaging upshifting-facilitation tooth TU51C. The lastly chain-engaging upshifting-facilitation tooth TU51C is adjacent to the at least one first axially recessed upshifting-facilitation tooth TU51 without another tooth therebetween in the circumferential direction D1. The lastly chain-engaging upshifting-facilitation tooth TU51C is provided on a downstream side of the at least one first axially recessed upshifting-facilitation tooth TU51 in the rotational driving direction D11. The lastly chain-engaging upshifting-facilitation tooth TU51C is configured to lastly disengage from an outer link plate of the bicycle chain C in the upshifting operation.

In this embodiment, the lastly chain-engaging upshifting-facilitation tooth TU51C is adjacent to the first upshifting-facilitation tooth TU51A without another tooth therebetween in the circumferential direction D1. The lastly chain-engaging upshifting-facilitation tooth TU51C is provided on a downstream side of the first upshifting-facilitation tooth TU51A in the rotational driving direction D11. However, the positional relationship among the first upshifting-facilitation tooth TU51A, the first additional upshifting-facilitation tooth TU51B, and the lastly chain-engaging upshifting-facilitation tooth TU51C is not limited to this embodiment.

The plurality of sprocket teeth SP5B includes an initially chain-engaging downshifting-facilitation tooth TD51C. The initially chain-engaging downshifting-facilitation tooth TD51C is adjacent to the at least one first axially recessed downshifting-facilitation tooth TD51 without another tooth therebetween in the circumferential direction D1. The initially chain-engaging downshifting-facilitation tooth TD51C is provided on an upstream side of the at least one first axially recessed downshifting-facilitation tooth TD51 in the rotational driving direction D11. The initially chain-engaging downshifting-facilitation tooth TD51C is configured to first receive the bicycle chain C in a downshifting operation in which the bicycle chain C is shifted from the smaller sprocket SP6 (FIG. 2) to the bicycle sprocket SP5.

In this embodiment, the initially chain-engaging downshifting-facilitation tooth TD51C is adjacent to the first downshifting-facilitation tooth TD51A without another tooth therebetween in the circumferential direction D1. The initially chain-engaging downshifting-facilitation tooth TD51C is provided on an upstream side of the first downshifting-facilitation tooth TD51A in the rotational driving direction D11. However, the positional relationship among the first downshifting-facilitation tooth TD51A, the first additional downshifting-facilitation tooth TD51B, and the initially chain-engaging downshifting-facilitation tooth TD51C is not limited to this embodiment.

As seen in FIG. 15, the first continuous recess CR51 has a plurality of recess depths DP51 defined from the second axially-facing surface SP5A2 of the sprocket body SP5A in the axial direction D2. The plurality of recess depths DP51 includes a first upshifting recess depth DPU51A and a second upshifting recess depth DPU51B. The first upshifting recess depth DPU51A is defined from the second axially-facing surface SP5A2 of the sprocket body SP5A in the axial direction D2. The second upshifting recess depth DPU51B is defined from the second axially-facing surface SP5A2 of the sprocket body SP5A in the axial direction D2. The second upshifting recess depth DPU51B is different from the first upshifting recess depth DPU51A. In this embodiment, the first upshifting recess depth DPU51A is larger than the second upshifting recess depth DPU51B. However, the first upshifting recess depth DPU51A can be equal to or smaller than the second upshifting recess depth DPU51B.

The plurality of recess depths DP51 includes a third upshifting recess depth DPU51C defined from the second axially-facing surface SP5A2 of the sprocket body SP5A in the axial direction D2. The third upshifting recess depth DPU51C is different from the first upshifting recess depth DPU51A. The third upshifting recess depth DPU51C is different from the second upshifting recess depth DPU51B. In this embodiment, the third upshifting recess depth DPU51C is larger than the second upshifting recess depth DPU51B. The third upshifting recess depth DPU51C is smaller than the first upshifting recess depth DPU51A. However, the dimensional relationship among the first to third upshifting recess depths DPU51A to DPU51C is not limited to this embodiment. The third upshifting recess depth DPU51C can be equal to or smaller than the second upshifting recess depth DPU51B.

In this embodiment, the first upshifting-facilitation tooth TU51A at least partly has the first upshifting recess depth DPU51A. The first additional upshifting-facilitation tooth TU51B at least partly has the second upshifting recess depth DPU51B. The first upshifting-facilitation tooth TU51A partly has the third upshifting recess depth DPU51C. The first additional upshifting-facilitation tooth TU51B at least partly has the first upshifting recess depth DPU51A. However, the first upshifting recess depth DPU51A can be omitted from the first additional upshifting-facilitation tooth TU51B. The third upshifting recess depth DPU51C can be omitted from the first upshifting-facilitation tooth TU51A.

As seen in FIG. 15, the plurality of recess depths DP51 includes a first downshifting recess depth DPD51A and a second downshifting recess depth DPD51B. The first downshifting recess depth DPD51A is defined from the second axially-facing surface SP5A2 of the sprocket body SP5A in the axial direction D2. The second downshifting recess depth DPD51B is defined from the second axially-facing surface SP5A2 of the sprocket body SP5A in the axial direction D2. The second downshifting recess depth DPD51B is different from the first downshifting recess depth DPD51A. The first downshifting recess depth DPD51A is larger than the second downshifting recess depth DPD51B. However, the first downshifting recess depth DPD51A can be equal to or smaller than the second downshifting recess depth DPD51B.

In this embodiment, the first downshifting-facilitation tooth TD51A at least partly has the first downshifting recess depth DPD51A. The first additional downshifting-facilitation tooth TD51B at least partly has the second downshifting recess depth DPD51B. The first additional downshifting-facilitation tooth TD51B at least partly has the first downshifting recess depth DPD51A. However, the first downshifting recess depth DPD51A can be omitted from the first additional downshifting-facilitation tooth TD51B.

The second upshifting recess depth DPU51B is equal to the second downshifting recess depth DPD51B. The first upshifting recess depth DPU51A is different from the first downshifting recess depth DPD51A. The first upshifting recess depth DPU51A is larger than the first downshifting recess depth DPD51A. However, the second upshifting recess depth DPU51B can be different from the second downshifting recess depth DPD51B. The first upshifting recess depth DPU51A can be equal to or smaller than the first downshifting recess depth DPD51A.

The first upshifting-facilitation tooth TU51A includes a first upshifting axial surface TU51A1 facing in the axial direction D2. The first upshifting recess depth DPU51A is defined from the first upshifting axial surface TU51A1 to the second axially-facing surface SP5A2 in the axial direction D2.

The first upshifting-facilitation tooth TU51A includes a first additional upshifting axial surface TU51A2 facing in the axial direction D2. The third upshifting recess depth DPU51C is defined from the second axially-facing surface SP5A2 to the first additional upshifting axial surface TU51A2 in the axial direction D2.

The first additional upshifting-facilitation tooth TU51B includes a second upshifting axial surface TU51B1 facing in the axial direction D2. The second upshifting recess depth DPU51B is defined from the second axially-facing surface SP5A2 to the second upshifting axial surface TU51B1 in the axial direction D2.

The first additional upshifting-facilitation tooth TU51B includes a second additional upshifting axial surface TU51B2 facing in the axial direction D2. The second additional upshifting axial surface TU51B2 is provided at the same axial position as that of the first upshifting axial surface TU51A1 in the axial direction D2.

The first downshifting-facilitation tooth TD51A includes a first downshifting axial surface TD51A1 facing in the axial direction D2. The first downshifting recess depth DPD51A is defined from the second axially-facing surface SP5A2 to the first downshifting axial surface TD51A1 in the axial direction D2.

The first additional downshifting-facilitation tooth TD51B includes a second downshifting axial surface TD51B1 facing in the axial direction D2. The second downshifting recess depth DPD51B is defined from the second axially-facing surface SP5A2 to the second downshifting axial surface TD51B1 in the axial direction D2.

The first additional downshifting-facilitation tooth TD51B includes a second additional downshifting axial surface TD51B2 facing in the axial direction D2. The second additional downshifting axial surface TD51B2 is provided at the same axial position as that of the first downshifting axial surface TD51A1 in the axial direction D2.

As seen in FIG. 15, the first continuous recess CR51 includes an upshifting-facilitation recess CR51A, a shifting-facilitation recess CR51B, a downshifting-facilitation recess CR51C, and an additional upshifting-facilitation recess CR51D. The upshifting-facilitation recess CR51A has the first upshifting recess depth DPU51A. The shifting-facilitation recess CR51B has the second upshifting recess depth DPU51B and the second downshifting recess depth DPD51B. The downshifting-facilitation recess CR51C has the first downshifting recess depth DPD51A. The additional upshifting-facilitation recess CR51D has the third upshifting recess depth DPU51C.

As seen in FIG. 16, the upshifting-facilitation recess CR51A is provided on the first upshifting-facilitation tooth TU51A and the first additional upshifting-facilitation tooth TU51B to facilitate the upshifting operation. The shifting-facilitation recess CR51B is provided on the first additional upshifting-facilitation tooth TU51B and the first additional downshifting-facilitation tooth TD51B to facilitate the upshifting operation and the downshifting operation. The downshifting-facilitation recess CR51C is provided on the first downshifting-facilitation tooth TD51A and the first additional downshifting-facilitation tooth TD51B to facilitate the downshifting operation.

The shifting-facilitation recess CR51B is provided between the upshifting-facilitation recess CR51A and the downshifting-facilitation recess CR51C in the circumferential direction D1. The downshifting-facilitation recess CR51C is provided on an upstream side of the shifting-facilitation recess CR51B in the rotational driving direction D11. The upshifting-facilitation recess CR51A is provided on a downstream side of the shifting-facilitation recess CR51B in the rotational driving direction D11. The additional upshifting-facilitation recess CR51D is provided on a downstream side of the upshifting-facilitation recess CR51A in the rotational driving direction D11. However, the structure of the first continuous recess CR51 is not limited to this embodiment. At least one of the upshifting-facilitation recess CR51A, the shifting-facilitation recess CR51B, the downshifting-facilitation recess CR51C, and the additional upshifting-facilitation recess CR51D can be omitted from the first continuous recess CR51.

Figure 17:
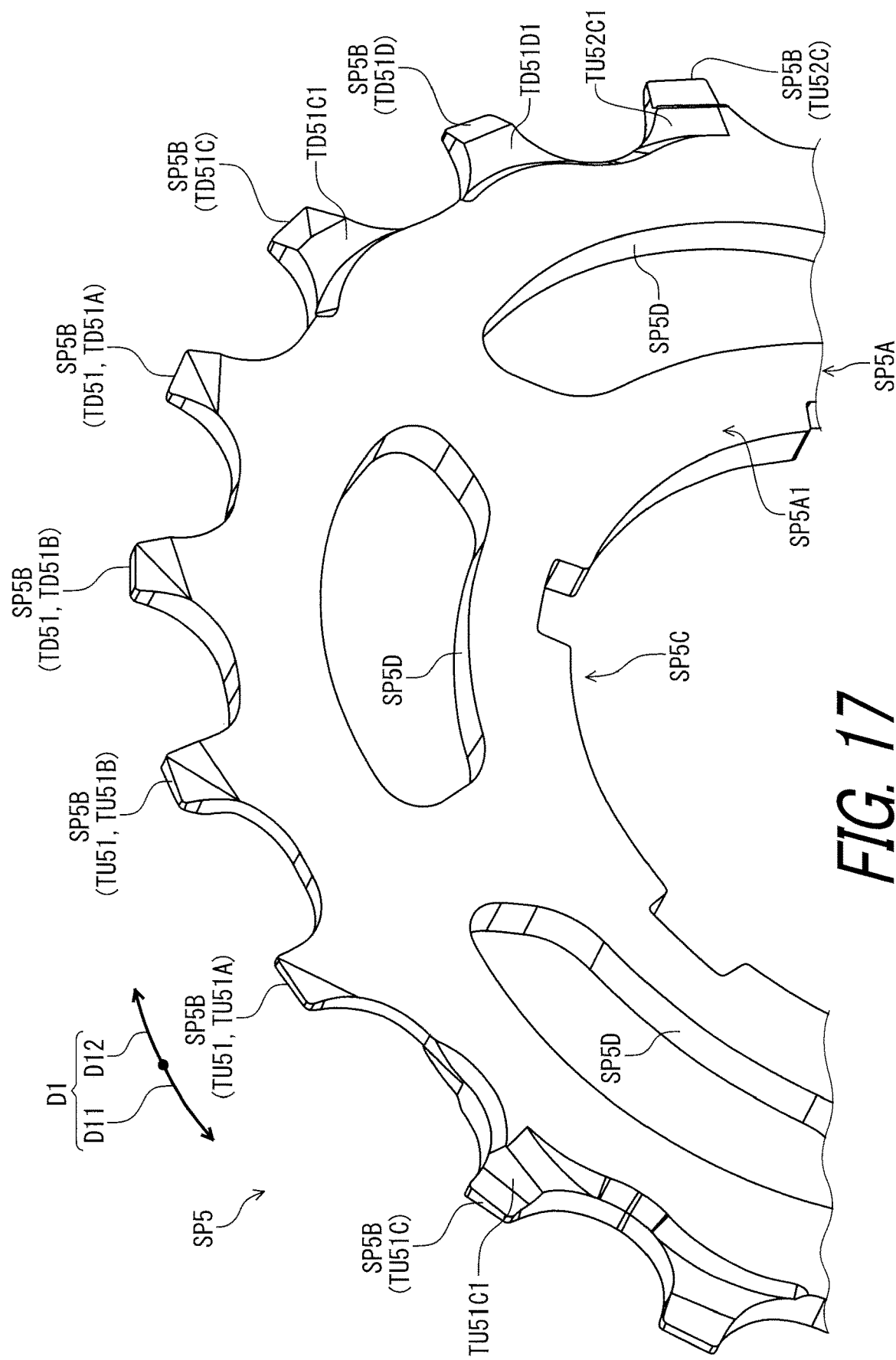
FIG. 17 is another partial perspective view of the bicycle sprocket illustrated in FIG. 8.

As seen in FIG. 17, the lastly chain-engaging upshifting-facilitation tooth TU51C includes an upshifting recess TU51C1 provided on the same side as the first axially-facing surface SP5A1. The upshifting recess TU51C1 is configured to direct the bicycle chain C to the smaller sprocket SP6 (FIG. 2) in the upshifting operation.

The initially chain-engaging downshifting-facilitation tooth TD51C includes a downshifting recess TD51C1 provided on the same side as the first axially-facing surface SP5A1. The downshifting recess TD51C1 is configured to facilitate initial receipt of the bicycle chain C at the initially chain-engaging downshifting-facilitation tooth TD51C in the downshifting operation.

Figure 18:
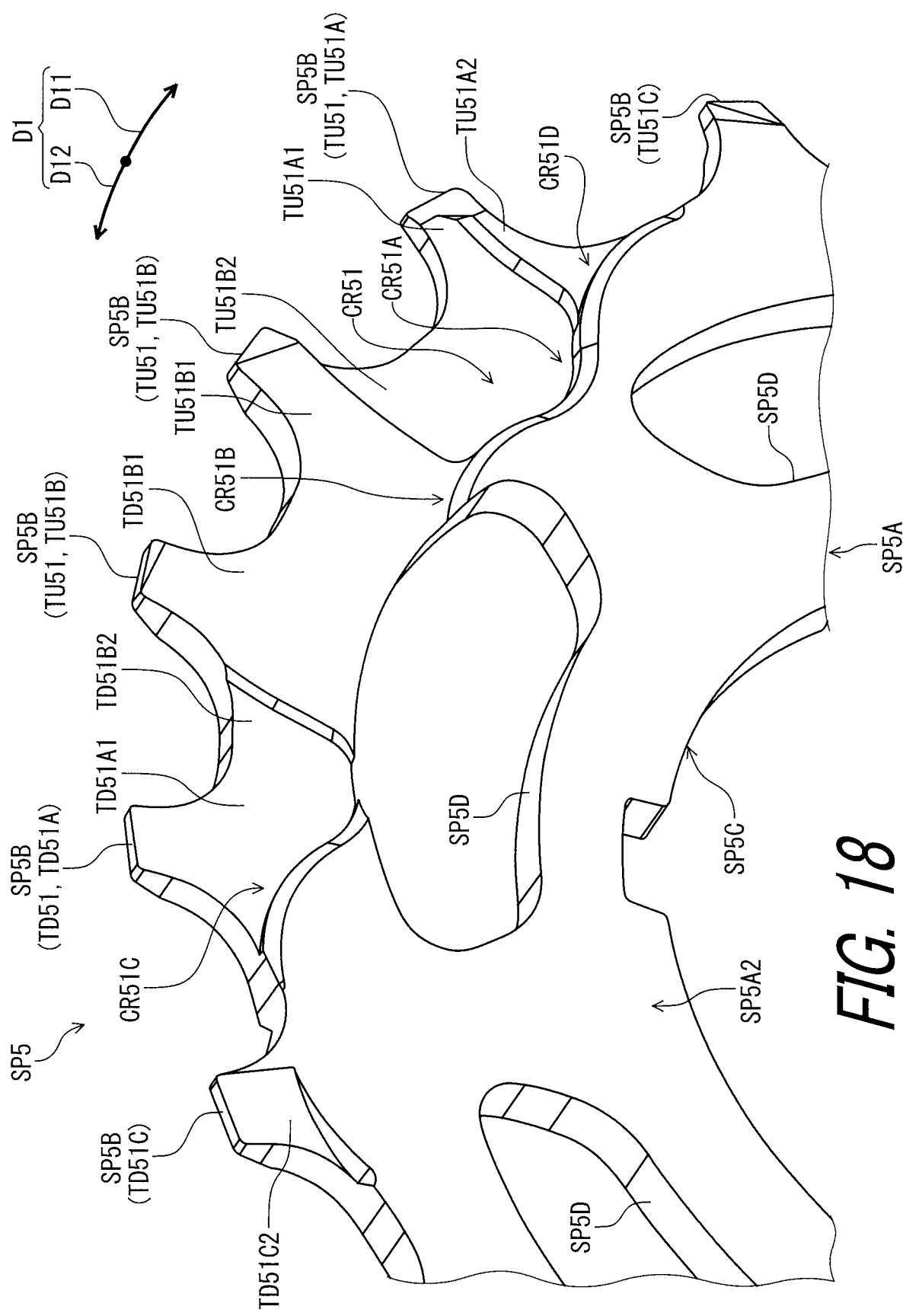
FIG. 18 is another partial perspective view of the bicycle sprocket illustrated in FIG. 8.

As seen in FIG. 18, the initially chain-engaging downshifting-facilitation tooth TD51C includes an additional downshifting recess TD51C2 provided on the same side as the second axially-facing surface SP5A2. The additional downshifting recess TD51C2 is configured to facilitate initial receipt of the bicycle chain C at the initially chain-engaging downshifting-facilitation tooth TD51C in the downshifting operation.

As seen in FIG. 17, the plurality of sprocket teeth SP5B includes an additional downshifting-facilitation tooth TD51D. The additional downshifting-facilitation tooth TD51D is adjacent to the initially chain-engaging downshifting-facilitation tooth TD51C without another tooth therebetween in the circumferential direction D1. The additional downshifting-facilitation tooth TD51D is provided on an upstream side of the initially chain-engaging downshifting-facilitation tooth TD51C in the rotational driving direction D11.

The additional downshifting-facilitation tooth TD51D includes a downshifting recess TD51D1 provided on the same side as the first axially-facing surface SP5A1. The downshifting recess TD51D1 is configured to facilitate engagement of the bicycle chain C with the additional downshifting-facilitation tooth TD51D in the downshifting operation.

As seen in FIG. 13, the bicycle sprocket SP5 comprises a plurality of first tooth bottoms B51A to B51H. The lastly chain-engaging upshifting-facilitation tooth TU51C is provided between the tooth bottoms B51A and B51B in the circumferential direction D1. The first upshifting-facilitation tooth TU51A is provided between the tooth bottoms B51B and B51C in the circumferential direction D1. The first additional upshifting-facilitation tooth TU51B is provided between the tooth bottoms B51C and B51D in the circumferential direction D1. The first additional downshifting-facilitation tooth TD51B is provided between the tooth bottoms B51D and B51E in the circumferential direction D1. The first downshifting-facilitation tooth TD51A is provided between the tooth bottoms B51E and B51F in the circumferential direction D1. The initially chain-engaging downshifting-facilitation tooth TD51C is provided between the tooth bottoms B51F and B51G in the circumferential direction D1. The additional downshifting-facilitation tooth TD51D is provided between the tooth bottoms B51G and B51H in the circumferential direction D1. The first continuous recess CR51 extends from the tooth bottom B51B to the tooth bottom B51F in the circumferential direction D1.

A radial line L51A is defined to extend from the rotational center axis A1 to the tooth bottom B51A when viewed along the rotational center axis A1. A radial line L51B is defined to extend from the rotational center axis A1 to the tooth bottom B51B. A radial line L51C is defined to extend from the rotational center axis A1 to the tooth bottom B51C. A radial line L51D is defined to extend from the rotational center axis A1 to the tooth bottom B51D. A radial line L51E is defined to extend from the rotational center axis A1 to the tooth bottom B51E. A radial line L51F is defined to extend from the rotational center axis A1 to the tooth bottom B51F. A radial line L51G is defined to extend from the rotational center axis A1 to the tooth bottom B51G. A radial line L51H is defined to extend from the rotational center axis A1 to the tooth bottom B51H.

The first upshifting axial surface TU51A1 and the first additional upshifting axial surface TU51A2 are provided between the radial lines L51B and L51C in the circumferential direction D1. The second upshifting axial surface TU51B1 and the second additional upshifting axial surface TU51B2 are provided between the radial lines L51C and L51D in the circumferential direction D1. The second downshifting axial surface TD51B1 and the second additional downshifting axial surface TD51B2 are provided between the radial lines L51D and L51E in the circumferential direction D1. The first downshifting axial surface TD51A1 is provided between the radial lines L51E and L51F in the circumferential direction D1.

The radial line L51E is provided on a boundary between the first downshifting axial surface TD51A1 and the second additional downshifting axial surface TD51B2 when viewed along the rotational center axis A1. The radial line L51D is provided on a boundary between the second downshifting axial surface TD51B1 and the second additional upshifting axial surface TU51B1 when viewed along the rotational center axis A1. The radial line L51C is provided on a boundary between the second additional upshifting axial surface TU51B2 and the first upshifting axial surface TU51A1 when viewed along the rotational center axis A1.

As seen in FIG. 13, the bicycle sprocket SP5 comprises a first upshifting-facilitation area FU51 configured to facilitate the upshifting operation. The bicycle sprocket SP5 comprises a first downshifting-facilitation area FD51 configured to facilitate the downshifting operation. The at least one first axially recessed upshifting-facilitation tooth TU51 (the first upshifting-facilitation tooth TU51A and the first additional upshifting-facilitation tooth TU51B) and the lastly chain-engaging upshifting-facilitation tooth TU51C are provided in the first upshifting-facilitation area FU51. The at least one first axially recessed downshifting-facilitation tooth TD51 (the first downshifting-facilitation tooth TD51A and the first additional downshifting-facilitation tooth TD51B), the initially chain-engaging downshifting-facilitation tooth TD51C, and the additional downshifting-facilitation tooth TD51D are provided in the first downshifting-facilitation area FD51. The first upshifting-facilitation area FU51 is defined between the tooth bottoms B51A to B51D in the circumferential direction D1. The first downshifting-facilitation area FD51 is defined between the tooth bottoms B51D to B51H in the circumferential direction D1. The term "upshifting-facilitation area", as used herein, is intended to be an area intentionally designed to facilitate an upshifting operation. The term "downshifting-facilitation area", as used herein, is intended to be an area intentionally designed to facilitate a downshifting operation.

As seen in FIG. 8, the plurality of sprocket teeth SP5B includes at least one second axially recessed upshifting-facilitation tooth TU52 with respect to the rotational center axis A1. The plurality of sprocket teeth SP5B includes at least one second axially recessed downshifting-facilitation tooth TD52 with respect to the rotational center axis A1.

The at least one second axially recessed downshifting-facilitation tooth TD52 is adjacent to the at least one second axially recessed upshifting-facilitation tooth TU52 without another tooth therebetween in the circumferential direction D1. The at least one second axially recessed downshifting-facilitation tooth TD52 is provided on an upstream side of the at least one second axially recessed upshifting-facilitation tooth TU52 in the rotational driving direction D11 of the bicycle sprocket SP5. However, the at least one second axially recessed downshifting-facilitation tooth TD52 can be provided on a downstream side of the at least one second axially recessed upshifting-facilitation tooth TU52 in the rotational driving direction D11 of the bicycle sprocket SP5.

The at least one second axially recessed upshifting-facilitation tooth TU52 has substantially the same structure as that of the at least one first axially recessed upshifting-facilitation tooth TU51. The at least one second axially recessed downshifting-facilitation tooth TD52 has substantially the same structure as that of the at least one first axially recessed downshifting-facilitation tooth TD51. Thus, the description of the at least one first axially recessed upshifting-facilitation tooth TU51 and the at least one first axially recessed downshifting-facilitation tooth TD51 can be utilized as the description of the at least one second axially recessed upshifting-facilitation tooth TU52 and the at least one second axially recessed downshifting-facilitation tooth TD52.

The at least one second axially recessed upshifting-facilitation tooth TU52 includes a second upshifting-facilitation tooth TU52A, a second additional upshifting-facilitation tooth TU52B, and a lastly chain-engaging upshifting-facilitation tooth TU52C. The second upshifting-facilitation tooth TU52A, the second additional upshifting-facilitation tooth TU52B, and the lastly chain-engaging upshifting-facilitation tooth TU52C have substantially the same structures as those of the first upshifting-facilitation tooth TU51A, the first additional upshifting-facilitation tooth TU51B, and the lastly chain-engaging upshifting-facilitation tooth TU51C. Thus, the description of the first upshifting-facilitation tooth TU51A, the first additional upshifting-facilitation tooth TU51B, and the lastly chain-engaging upshifting-facilitation tooth TU51C can be utilized as the description of the second upshifting-facilitation tooth TU52A, the second additional upshifting-facilitation tooth TU52B, and the lastly chain-engaging upshifting-facilitation tooth TU52C.

The at least one second axially recessed downshifting-facilitation tooth TD52 includes a second downshifting-facilitation tooth TD52A, a second additional downshifting-facilitation tooth TD52B, an initially chain-engaging downshifting-facilitation tooth TD52C, and an additional downshifting-facilitation tooth TD52D. The second downshifting-facilitation tooth TD52A, the second additional downshifting-facilitation tooth TD52B, the initially chain-engaging downshifting-facilitation tooth TD52C, and the additional downshifting-facilitation tooth TD52D have substantially the same structures as those of the first downshifting-facilitation tooth TD51A, the first additional downshifting-facilitation tooth TD51B, the initially chain-engaging downshifting-facilitation tooth TD51C, and the additional downshifting-facilitation tooth TD51D. Thus, the description of the first downshifting-facilitation tooth TD51A, the first additional downshifting-facilitation tooth TD51B, the initially chain-engaging downshifting-facilitation tooth TD51C, and the additional downshifting-facilitation tooth TD51D can be utilized as the description of the second downshifting-facilitation tooth TD52A, the second additional downshifting-facilitation tooth TD52B, the initially chain-engaging downshifting-facilitation tooth TD52C, and the additional downshifting-facilitation tooth TD52D.

The at least one second axially recessed upshifting-facilitation tooth TU52 and the at least one second axially recessed downshifting-facilitation tooth TD52 provide a second continuous recess CR52 extending in the circumferential direction D1 with respect to the rotational center axis A1. In this embodiment, the second continuous recess CR52 is provided on the second axially-facing surface SP5A2. The second continuous recess CR52 has substantially the same structure as that of the first continuous recess CR51. Thus, the description of the first continuous recess CR51 can be utilized as the description of the second continuous recess CR52.

In this embodiment, the second continuous recess CR52 can be also referred to as a continuous recess CR52. The second upshifting-facilitation tooth TU52A, the second additional upshifting-facilitation tooth TU52B, the second downshifting-facilitation tooth TD52A, and the second additional downshifting-facilitation tooth TD52B provide the second continuous recess CR52. In other words, the at least four axially recessed teeth TU52A, TU52B, TD52A, and TD52B provide the continuous recess CR52 extending in the circumferential direction D1.

The bicycle sprocket SP5 comprises a second upshifting-facilitation area FU52 and a second downshifting-facilitation area FD52. The second upshifting-facilitation area FU52 and the second downshifting-facilitation area FD52 have substantially the same structures as those of the first upshifting-facilitation area FU51 and the first downshifting-facilitation area FD51. Thus, the description of the first upshifting-facilitation area FU51 and the first downshifting-facilitation area FD51 can be utilized as the description of the second upshifting-facilitation area FU52 and the second downshifting-facilitation area FD52.

As seen in FIG. 8, the plurality of sprocket teeth SP5B includes at least one third axially recessed upshifting-facilitation tooth TU53 with respect to the rotational center axis A1. The plurality of sprocket teeth SP5B includes at least one third axially recessed downshifting-facilitation tooth TD53 with respect to the rotational center axis A1.

The at least one third axially recessed downshifting-facilitation tooth TD53 is adjacent to the at least one third axially recessed upshifting-facilitation tooth TU53 without another tooth therebetween in the circumferential direction D1. The at least one third axially recessed downshifting-facilitation tooth TD53 is provided on an upstream side of the at least one third axially recessed upshifting-facilitation tooth TU53 in the rotational driving direction D11 of the bicycle sprocket SP5. However, the at least one third axially recessed downshifting-facilitation tooth TD53 can be provided on a downstream side of the at least one third axially recessed upshifting-facilitation tooth TU53 in the rotational driving direction D11 of the bicycle sprocket SP5.

The at least one third axially recessed upshifting-facilitation tooth TU53 has substantially the same structure as that of the at least one first axially recessed upshifting-facilitation tooth TU51. The at least one third axially recessed downshifting-facilitation tooth TD53 has substantially the same structure as that of the at least one first axially recessed downshifting-facilitation tooth TD51. Thus, the description of the at least one first axially recessed upshifting-facilitation tooth TU51 and the at least one first axially recessed downshifting-facilitation tooth TD51 can be utilized as the description of the at least one third axially recessed upshifting-facilitation tooth TU53 and the at least one third axially recessed downshifting-facilitation tooth TD53.

The at least one third axially recessed upshifting-facilitation tooth TU53 includes a third upshifting-facilitation tooth TU53A, a third additional upshifting-facilitation tooth TU53B, and a lastly chain-engaging upshifting-facilitation tooth TU53C. The third upshifting-facilitation tooth TU53A, the third additional upshifting-facilitation tooth TU53B, and the lastly chain-engaging upshifting-facilitation tooth TU53C have substantially the same structures as those of the first upshifting-facilitation tooth TU51A, the first additional upshifting-facilitation tooth TU51B, and the lastly chain-engaging upshifting-facilitation tooth TU51C. Thus, the description of the first upshifting-facilitation tooth TU51A, the first additional upshifting-facilitation tooth TU51B, and the lastly chain-engaging upshifting-facilitation tooth TU51C can be utilized as the description of the third upshifting-facilitation tooth TU53A, the third additional upshifting-facilitation tooth TU53B, and the lastly chain-engaging upshifting-facilitation tooth TU53C.

The at least one third axially recessed downshifting-facilitation tooth TD53 includes a third downshifting-facilitation tooth TD53A, an initially chain-engaging downshifting-facilitation tooth TD53C, and an additional downshifting-facilitation tooth TD53D. The third additional upshifting-facilitation tooth TU53B also functions as a downshifting-facilitation tooth corresponding to the first additional downshifting-facilitation tooth TD51B. Thus, the at least one third axially recessed downshifting-facilitation tooth TD53 further includes the third additional upshifting-facilitation tooth TU53B. The third downshifting-facilitation tooth TD53A, the third additional upshifting-facilitation tooth TU53B as the downshifting-facilitation tooth, the initially chain-engaging downshifting-facilitation tooth TD53C, and the additional downshifting-facilitation tooth TD53D have substantially the same structures as those of the first downshifting-facilitation tooth TD51A, the first additional downshifting-facilitation tooth TD51B, the initially chain-engaging downshifting-facilitation tooth TD51C, and the additional downshifting-facilitation tooth TD51D. Thus, the description of the first downshifting-facilitation tooth TD51A, the first additional downshifting-facilitation tooth TD51B, the initially chain-engaging downshifting-facilitation tooth TD51C, and the additional downshifting-facilitation tooth TD51D can be utilized as the description of the third downshifting-facilitation tooth TD53A, the third additional upshifting-facilitation tooth TU53B as the downshifting-facilitation tooth, the initially chain-engaging downshifting-facilitation tooth TD53C, and the additional downshifting-facilitation tooth TD53D.

The at least one third axially recessed upshifting-facilitation tooth TU53 and the at least one third axially recessed downshifting-facilitation tooth TD53 provide a third continuous recess CR53 extending in the circumferential direction D1 with respect to the rotational center axis A1. In this embodiment, the third continuous recess CR53 is provided on the second axially-facing surface SP5A2. The third upshifting-facilitation tooth TU53A, the third additional upshifting-facilitation tooth TU53B, and the third downshifting-facilitation tooth TD53A provide the third continuous recess CR53. The third continuous recess CR53 has substantially the same structure as that of the first continuous recess CR51. Thus, the description of the first continuous recess CR51 can be utilized as the description of the third continuous recess CR53.

The bicycle sprocket SP5 comprises a third upshifting-facilitation area FU53 and a third downshifting-facilitation area FD53. The third upshifting-facilitation area FU53 and the third downshifting-facilitation area FD53 have substantially the same structures as those of the first upshifting-facilitation area FU51 and the first downshifting-facilitation area FD51. Thus, the description of the first upshifting-facilitation area FU51 and the first downshifting-facilitation area FD51 can be utilized as the description of the third upshifting-facilitation area FU53 and the third downshifting-facilitation area FD53.

The bicycle sprockets SP2 to SP4 and SP6 to SP8 have substantially the same structures as that of the bicycle sprocket SP5.

As seen in FIG. 5, for example, the plurality of sprocket teeth SP2B includes at least one first axially recessed upshifting-facilitation tooth TU21 and at least one first axially recessed downshifting-facilitation tooth TD21. The at least one first axially recessed upshifting-facilitation tooth TU21 includes a first upshifting-facilitation tooth TU21A, a first additional upshifting-facilitation tooth TU21B, and a lastly chain-engaging upshifting-facilitation tooth TU21C. The at least one first axially recessed downshifting-facilitation tooth TD21 includes a first downshifting-facilitation tooth TD21A, a first additional downshifting-facilitation tooth TD21B, an initially chain-engaging downshifting-facilitation tooth TD21C, and an additional downshifting-facilitation tooth TD21D.

The at least one first axially recessed upshifting-facilitation tooth TU21 and the at least one first axially recessed downshifting-facilitation tooth TD21 provide a first continuous recess CR21 extending in the circumferential direction D1 with respect to the rotational center axis A1. The first upshifting-facilitation tooth TU21A, the first additional upshifting-facilitation tooth TU21B, the first downshifting-facilitation tooth TD21A, and the first additional downshifting-facilitation tooth TD21B provide the first continuous recess CR21.

As seen in FIG. 5, the plurality of sprocket teeth SP2B includes at least one second axially recessed upshifting-facilitation tooth TU22 and at least one second axially recessed downshifting-facilitation tooth TD22. The at least one second axially recessed upshifting-facilitation tooth TU22 includes a second upshifting-facilitation tooth TU22A, a second additional upshifting-facilitation tooth TU22B, and a lastly chain-engaging upshifting-facilitation tooth TU22C. The at least one second axially recessed downshifting-facilitation tooth TD22 includes a second downshifting-facilitation tooth TD22A, a second additional downshifting-facilitation tooth TD22B, an initially chain-engaging downshifting-facilitation tooth TD22C, and an additional downshifting-facilitation tooth TD22D.

The at least one second axially recessed upshifting-facilitation tooth TU22 and the at least one second axially recessed downshifting-facilitation tooth TD22 provide a second continuous recess CR22 extending in the circumferential direction D1 with respect to the rotational center axis A1. The second upshifting-facilitation tooth TU22A, the second additional upshifting-facilitation tooth TU22B, the second downshifting-facilitation tooth TD22A, and the second additional downshifting-facilitation tooth TD22B provide the second continuous recess CR22.

As seen in FIG. 6, the plurality of sprocket teeth SP3B includes at least one first axially recessed upshifting-facilitation tooth TU31 and at least one first axially recessed downshifting-facilitation tooth TD31. The at least one first axially recessed upshifting-facilitation tooth TU31 includes a first upshifting-facilitation tooth TU31A, a first additional upshifting-facilitation tooth TU31B, and a lastly chain-engaging upshifting-facilitation tooth TU31C. The at least one first axially recessed downshifting-facilitation tooth TD31 includes a first downshifting-facilitation tooth TD31A, a first additional downshifting-facilitation tooth TD31B, an initially chain-engaging downshifting-facilitation tooth TD31C, and an additional downshifting-facilitation tooth TD31D.

The at least one first axially recessed upshifting-facilitation tooth TU31 and the at least one first axially recessed downshifting-facilitation tooth TD31 provide a first continuous recess CR31 extending in the circumferential direction D1 with respect to the rotational center axis A1. The first upshifting-facilitation tooth TU31A, the first additional upshifting-facilitation tooth TU31B, the first downshifting-facilitation tooth TD31A, and the first additional downshifting-facilitation tooth TD31B provide the first continuous recess CR31.

As seen in FIG. 7, the plurality of sprocket teeth SP4B includes at least one first axially recessed upshifting-facilitation tooth TU41 and at least one first axially recessed downshifting-facilitation tooth TD41. The at least one first axially recessed upshifting-facilitation tooth TU41 includes a first upshifting-facilitation tooth TU41A, a first additional upshifting-facilitation tooth TU41B, and a lastly chain-engaging upshifting-facilitation tooth TU41C. The at least one first axially recessed downshifting-facilitation tooth TD41 includes a first downshifting-facilitation tooth TD41A, a first additional downshifting-facilitation tooth TD41B, an initially chain-engaging downshifting-facilitation tooth TD41C, and an additional downshifting-facilitation tooth TD41D.

The at least one first axially recessed upshifting-facilitation tooth TU41 and the at least one first axially recessed downshifting-facilitation tooth TD41 provide a first continuous recess CR41 extending in the circumferential direction D1 with respect to the rotational center axis A1. The first upshifting-facilitation tooth TU41A, the first additional upshifting-facilitation tooth TU41B, the first downshifting-facilitation tooth TD41A, and the first additional downshifting-facilitation tooth TD41B provide the first continuous recess CR41.

As seen in FIG. 9, for example, the plurality of sprocket teeth SP6B includes at least one first axially recessed upshifting-facilitation tooth TU61 and at least one first axially recessed downshifting-facilitation tooth TD61. The at least one first axially recessed upshifting-facilitation tooth TU61 includes a first upshifting-facilitation tooth TU61A, a first additional upshifting-facilitation tooth TU61B, and a lastly chain-engaging upshifting-facilitation tooth TU61C. The at least one first axially recessed downshifting-facilitation tooth TD61 includes a first downshifting-facilitation tooth TD61A, a first additional downshifting-facilitation tooth TD61B, an initially chain-engaging downshifting-facilitation tooth TD61C, and an additional downshifting-facilitation tooth TD61D.

The at least one first axially recessed upshifting-facilitation tooth TU61 and the at least one first axially recessed downshifting-facilitation tooth TD61 provide a first continuous recess CR61 extending in the circumferential direction D1 with respect to the rotational center axis A1. The first upshifting-facilitation tooth TU61A, the first additional upshifting-facilitation tooth TU61B, the first downshifting-facilitation tooth TD61A, and the first additional downshifting-facilitation tooth TD61B provide the first continuous recess CR61.

As seen in FIG. 9, the plurality of sprocket teeth SP6B includes at least one second axially recessed upshifting-facilitation tooth TU62 and at least one second axially recessed downshifting-facilitation tooth TD62. The at least one second axially recessed upshifting-facilitation tooth TU62 includes a second upshifting-facilitation tooth TU62A, a second additional upshifting-facilitation tooth TU62B, and a lastly chain-engaging upshifting-facilitation tooth TU62C. The at least one second axially recessed downshifting-facilitation tooth TD62 includes a second downshifting-facilitation tooth TD62A, a second additional downshifting-facilitation tooth TD62B, an initially chain-engaging downshifting-facilitation tooth TD62C, and an additional downshifting-facilitation tooth TD62D.

The at least one second axially recessed upshifting-facilitation tooth TU62 and the at least one second axially recessed downshifting-facilitation tooth TD62 provide a second continuous recess CR62 extending in the circumferential direction D1 with respect to the rotational center axis A1. The second upshifting-facilitation tooth TU62A, the second additional upshifting-facilitation tooth TU62B, the second downshifting-facilitation tooth TD62A, and the second additional downshifting-facilitation tooth TD62B provide the second continuous recess CR62.

As seen in FIG. 10, for example, the plurality of sprocket teeth SP7B includes at least one first axially recessed upshifting-facilitation tooth TU71 and at least one first axially recessed downshifting-facilitation tooth TD71. The at least one first axially recessed upshifting-facilitation tooth TU71 includes a first upshifting-facilitation tooth TU71A, a first additional upshifting-facilitation tooth TU71B, and a lastly chain-engaging upshifting-facilitation tooth TU71C. The at least one first axially recessed downshifting-facilitation tooth TD71 includes a first downshifting-facilitation tooth TD71A, a first additional downshifting-facilitation tooth TD71B, an initially chain-engaging downshifting-facilitation tooth TD71C, and an additional downshifting-facilitation tooth TD71D.

The at least one first axially recessed upshifting-facilitation tooth TU71 and the at least one first axially recessed downshifting-facilitation tooth TD71 provide a first continuous recess CR71 extending in the circumferential direction D1 with respect to the rotational center axis A1. The first upshifting-facilitation tooth TU71A, the first additional upshifting-facilitation tooth TU71B, the first downshifting-facilitation tooth TD71A, and the first additional downshifting-facilitation tooth TD71B provide the first continuous recess CR71.

As seen in FIG. 10, the plurality of sprocket teeth SP7B includes at least one second axially recessed upshifting-facilitation tooth TU72 and at least one second axially recessed downshifting-facilitation tooth TD72. The at least one second axially recessed upshifting-facilitation tooth TU72 includes a second upshifting-facilitation tooth TU72A, a second additional upshifting-facilitation tooth TU72B, and a lastly chain-engaging upshifting-facilitation tooth TU72C. The at least one second axially recessed downshifting-facilitation tooth TD72 includes a second downshifting-facilitation tooth TD72A, a second additional downshifting-facilitation tooth TD72B, an initially chain-engaging downshifting-facilitation tooth TD72C, and an additional downshifting-facilitation tooth TD72D.

The at least one second axially recessed upshifting-facilitation tooth TU72 and the at least one second axially recessed downshifting-facilitation tooth TD72 provide a second continuous recess CR72 extending in the circumferential direction D1 with respect to the rotational center axis A1. The second upshifting-facilitation tooth TU72A, the second additional upshifting-facilitation tooth TU72B, the second downshifting-facilitation tooth TD72A, and the second additional downshifting-facilitation tooth TD72B provide the second continuous recess CR72.

As seen in FIG. 11, for example, the plurality of sprocket teeth SP8B includes at least one first axially recessed upshifting-facilitation tooth TU81 and at least one first axially recessed downshifting-facilitation tooth TD81. The at least one first axially recessed upshifting-facilitation tooth TU81 includes a first upshifting-facilitation tooth TU81A, a first additional upshifting-facilitation tooth TU81B, and a lastly chain-engaging upshifting-facilitation tooth TU81C. The at least one first axially recessed downshifting-facilitation tooth TD81 includes a first downshifting-facilitation tooth TD81A, a first additional downshifting-facilitation tooth TD81B, an initially chain-engaging downshifting-facilitation tooth TD81C, and an additional downshifting-facilitation tooth TD81D.

The at least one first axially recessed upshifting-facilitation tooth TU81 and the at least one first axially recessed downshifting-facilitation tooth TD81 provide a first continuous recess CR81 extending in the circumferential direction D1 with respect to the rotational center axis A1. The first upshifting-facilitation tooth TU81A, the first additional upshifting-facilitation tooth TU81B, the first downshifting-facilitation tooth TD81A, and the first additional downshifting-facilitation tooth TD81B provide the first continuous recess CR81.

As seen in FIG. 11, the plurality of sprocket teeth SP8B includes at least one third axially recessed upshifting-facilitation tooth TU83 and at least one third axially recessed downshifting-facilitation tooth TD83. The at least one third axially recessed upshifting-facilitation tooth TU83 includes a third upshifting-facilitation tooth TU83A, a third additional upshifting-facilitation tooth TU83B, and a lastly chain-engaging upshifting-facilitation tooth TU83C. The third additional upshifting-facilitation tooth TU83B also functions as a downshifting-facilitation tooth corresponding to the first additional downshifting-facilitation tooth TD81B. Thus, the at least one third axially recessed downshifting-facilitation tooth TD83 includes a third downshifting-facilitation tooth TD83A, the third additional upshifting-facilitation tooth TU83B as the downshifting-facilitation tooth, an initially chain-engaging downshifting-facilitation tooth TD83C, and an additional downshifting-facilitation tooth TD83D.

The at least one third axially recessed upshifting-facilitation tooth TU83 and the at least one third axially recessed downshifting-facilitation tooth TD83 provide a third continuous recess CR83 extending in the circumferential direction D1 with respect to the rotational center axis A1. The third upshifting-facilitation tooth TU83A, the third additional upshifting-facilitation tooth TU83B, and the third downshifting-facilitation tooth TD83A provide the third continuous recess CR83.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
   a sprocket body having a first axially-facing surface and a second axially-facing surface with respect to a rotational center axis of the bicycle sprocket, the second axially-facing surface being opposite to the first axially-facing surface in an axial direction with respect to the rotational center axis, the first axially-facing surface being configured to face a center plane of a bicycle in an assembled state where the bicycle sprocket is mounted to the bicycle;
   a plurality of sprocket teeth extending radially outwardly from the sprocket body with respect to the rotational center axis;
   the plurality of sprocket teeth including at least one first axially recessed upshifting-facilitation tooth with respect to the rotational center axis, the at least one first axially recessed upshifting-facilitation tooth being recessed from the second axially-facing surface toward the first axially-facing surface;
   the plurality of sprocket teeth including at least one first axially recessed downshifting-facilitation tooth with respect to the rotational center axis, the at least one first axially recessed downshifting-facilitation tooth being recessed from the second axially-facing surface toward the first axially-facing surface, the at least one first axially recessed downshifting-facilitation tooth being adjacent to the at least one first axially recessed upshifting-facilitation tooth without another tooth therebetween in a circumferential direction with respect to the rotational center axis; and
   the at least one first axially recessed upshifting-facilitation tooth and the at least one first axially recessed downshifting-facilitation tooth providing a first continuous recess extending in the circumferential direction.

2. The bicycle sprocket according to claim 1, wherein
the at least one first axially recessed downshifting-facilitation tooth is provided on an upstream side of the at least one first axially recessed upshifting-facilitation tooth in a rotational driving direction of the bicycle sprocket.

3. The bicycle sprocket according to claim 1, wherein
the at least one first axially recessed upshifting-facilitation tooth includes:
   a first upshifting-facilitation tooth recessed in the axial direction; and
   a first additional upshifting-facilitation tooth recessed in the axial direction and adjacent to the first upshifting-facilitation tooth without another tooth therebetween in the circumferential direction.

4. The bicycle sprocket according to claim 1, wherein
the plurality of sprocket teeth includes a lastly chain-engaging upshifting-facilitation tooth adjacent to the at least one first axially recessed upshifting-facilitation tooth without another tooth therebetween in the circumferential direction, the lastly chain-engaging upshifting-facilitation tooth being provided on a downstream side of the at least one first axially recessed upshifting-facilitation tooth in the rotational driving direction.

5. The bicycle sprocket according to claim 1, wherein
the at least one first axially recessed downshifting-facilitation tooth includes:
   a first downshifting-facilitation tooth recessed in the axial direction; and
   a first additional downshifting-facilitation tooth recessed in the axial direction and adjacent to the first downshifting-facilitation tooth without another tooth therebetween in the circumferential direction.

6. The bicycle sprocket according to claim 1, wherein
the plurality of sprocket teeth includes an initially chain-engaging downshifting-facilitation tooth adjacent to the at least one first axially recessed downshifting-facilitation tooth without another tooth therebetween in the circumferential direction, the initially chain-engaging downshifting-facilitation tooth being provided on an upstream side of the at least one first axially recessed downshifting-facilitation tooth in the rotational driving direction.

7. The bicycle sprocket according to claim 1, wherein
the at least one first axially recessed upshifting-facilitation tooth includes:
   a first upshifting-facilitation tooth recessed in the axial direction; and
   a first additional upshifting-facilitation tooth recessed in the axial direction and adjacent to the first upshifting-facilitation tooth without another tooth therebetween in the circumferential direction,
the at least one first axially recessed downshifting-facilitation tooth includes:
   a first downshifting-facilitation tooth recessed in the axial direction; and
   a first additional downshifting-facilitation tooth recessed in the axial direction and adjacent to the first downshifting-facilitation tooth without another tooth therebetween in the circumferential direction, and
the first upshifting-facilitation tooth, the first additional upshifting-facilitation tooth, the first downshifting-facilitation tooth, and the first additional downshifting-facilitation tooth provide the first continuous recess.

8. The bicycle sprocket according to claim 7, wherein
the first additional upshifting-facilitation tooth is adjacent to the first additional downshifting-facilitation tooth without another tooth therebetween in the circumferential direction.

9. The bicycle sprocket according to claim 8, wherein
the first additional upshifting-facilitation tooth is provided on a downstream side of the first additional downshifting-facilitation tooth in the rotational driving direction.

10. The bicycle sprocket according to claim 1, wherein
the plurality of sprocket teeth includes at least one second axially recessed upshifting-facilitation tooth with respect to the rotational center axis,
the plurality of sprocket teeth includes at least one second axially recessed downshifting-facilitation tooth with respect to the rotational center axis, the at least one second axially recessed downshifting-facilitation tooth being adjacent to the at least one second axially recessed upshifting-facilitation tooth without another tooth therebetween in the circumferential direction, the at least one second axially recessed downshifting-facilitation tooth being provided on an upstream side of the at least one second axially recessed upshifting-facilitation tooth in the rotational driving direction of the bicycle sprocket, and
the at least one second axially recessed upshifting-facilitation tooth and the at least one second axially recessed downshifting-facilitation tooth provide a second continuous recess extending in the circumferential direction with respect to the rotational center axis.

11. The bicycle sprocket according to claim 1, wherein
the first continuous recess has a plurality of recess depths defined from the second axially-facing surface of the sprocket body in the axial direction.

12. The bicycle sprocket according to claim 11, wherein
the at least one first axially recessed upshifting-facilitation tooth includes:
   a first upshifting-facilitation tooth recessed in the axial direction; and
   a first additional upshifting-facilitation tooth recessed in the axial direction and adjacent to the first axially recessed upshifting-facilitation tooth without another tooth therebetween in the circumferential direction,
the first additional upshifting-facilitation tooth is provided on an upstream side of the first upshifting-facilitation tooth in the rotational driving direction,
the plurality of recess depths includes:
   a first upshifting recess depth defined from the second axially-facing surface of the sprocket body in the axial direction; and
   a second upshifting recess depth defined from the second axially-facing surface of the sprocket body in the axial direction, the second upshifting recess depth being different from the first upshifting recess depth,
the first upshifting-facilitation tooth at least partly has the first upshifting recess depth, and
the first additional upshifting-facilitation tooth at least partly has the second upshifting recess depth.

13. The bicycle sprocket according to claim 12, wherein
the first upshifting recess depth is larger than the second upshifting recess depth.

14. The bicycle sprocket according to claim 11, wherein
the at least one first axially recessed downshifting-facilitation tooth includes:
   a first downshifting-facilitation tooth recessed in the axial direction; and
   a first additional downshifting-facilitation tooth recessed in the axial direction and adjacent to the first downshifting-facilitation tooth without another tooth therebetween in the circumferential direction,
the first additional downshifting-facilitation tooth is provided on a downstream side of the first downshifting-facilitation tooth in the rotational driving direction,
the plurality of recess depths includes:
   a first downshifting recess depth defined from the second axially-facing surface of the sprocket body in the axial direction; and
   a second downshifting recess depth defined from the second axially-facing surface of the sprocket body in the axial direction, the second downshifting recess depth being different from the first downshifting recess depth,
the first downshifting-facilitation tooth at least partly has the first downshifting recess depth, and
the first additional downshifting-facilitation tooth at least partly has the second downshifting recess depth.

15. The bicycle sprocket according to claim 14, wherein
the first downshifting recess depth is larger than the second downshifting recess depth.

16. The bicycle sprocket according to claim 12, wherein
the plurality of recess depths includes a third upshifting recess depth defined from the second axially-facing surface of the sprocket body in the axial direction, the third upshifting recess depth being different from the first upshifting recess depth, and
the first upshifting-facilitation tooth partly has the third upshifting recess depth.

17. The bicycle sprocket according to claim 16, wherein
the third upshifting recess depth is larger than the second upshifting recess depth.

18. The bicycle sprocket according to claim 4, wherein
the lastly chain-engaging upshifting-facilitation tooth includes an upshifting recess provided on the same side as the first axially-facing surface.

19. The bicycle sprocket according to claim 6, wherein
the initially chain-engaging downshifting-facilitation tooth includes a downshifting recess provided on the same side as the first axially-facing surface.

20. A bicycle sprocket comprising:
a sprocket body having a first axially-facing surface and a second axially-facing surface with respect to a rotational center axis of the bicycle sprocket, the second axially-facing surface being opposite to the first axially-facing surface in an axial direction with respect to the rotational center axis, the first axially-facing surface being configured to face a center plane of a bicycle in an assembled state where the bicycle sprocket is mounted to the bicycle;
a plurality of sprocket teeth extending radially outwardly from the sprocket body with respect to the rotational center axis;
the plurality of sprocket teeth including at least four axially recessed teeth with respect to the rotational center axis, the at least four axially recessed teeth being recessed from the second axially-facing surface toward the first axially-facing surface;
the at least four axially recessed teeth providing a continuous recess extending in the circumferential direction; and
the plurality of sprocket teeth including an additional tooth, at least a portion of the continuous recess being recessed in relation to at least a portion of the additional tooth located at a same radial distance from the rotational center axis as the portion of the continuous recess.

* * * * *